United States Patent
Adolph et al.

(10) Patent No.: US 12,545,830 B2
(45) Date of Patent: Feb. 10, 2026

(54) BRINE-TOLERANT COMPOSITIONS COMPRISING FATTY ACID OR FATTY ESTER REACTION PRODUCTS OF SACCHARIDE POLYMERS

(71) Applicant: INTEGRITY BIO-CHEMICALS, LLC, Cresson, TX (US)

(72) Inventors: Brandy Adolph, Cresson, TX (US); Matthew B. Blackmon, Cresson, TX (US); Stephen W. Almond, Creston, CA (US)

(73) Assignee: INTEGRITY BIO-CHEMICALS, LLC, Cresson, TX (US)

( * ) Notice: Subject to any disclaimer, the term of this patent is extended or adjusted under 35 U.S.C. 154(b) by 0 days.

(21) Appl. No.: 18/853,566

(22) PCT Filed: Apr. 17, 2023

(86) PCT No.: PCT/US2023/018792
§ 371 (c)(1),
(2) Date: Oct. 2, 2024

(87) PCT Pub. No.: WO2023/205067
PCT Pub. Date: Oct. 26, 2023

(65) Prior Publication Data
US 2025/0223489 A1    Jul. 10, 2025

Related U.S. Application Data

(60) Provisional application No. 63/331,978, filed on Apr. 18, 2022.

(51) Int. Cl.
| | |
|---|---|
| C09K 8/68 | (2006.01) |
| C09K 8/08 | (2006.01) |
| C09K 8/42 | (2006.01) |
| C09K 8/514 | (2006.01) |
| C09K 8/52 | (2006.01) |
| C09K 8/584 | (2006.01) |
| C09K 8/60 | (2006.01) |
| C09K 8/74 | (2006.01) |
| C09K 8/90 | (2006.01) |

(52) U.S. Cl.
CPC ............... *C09K 8/604* (2013.01); *C09K 8/08* (2013.01); *C09K 8/42* (2013.01); *C09K 8/514* (2013.01); *C09K 8/52* (2013.01); *C09K 8/584* (2013.01); *C09K 8/68* (2013.01); *C09K 8/74* (2013.01); *C09K 8/90* (2013.01)

(58) Field of Classification Search
CPC . C09K 8/604; C09K 8/08; C09K 8/42; C09K 8/514; C09K 8/52; C09K 8/584; C09K 8/68; C09K 8/74; C09K 8/90
See application file for complete search history.

(56) References Cited

U.S. PATENT DOCUMENTS

| | | | |
|---|---|---|---|
| 7,618,926 B1 | 11/2009 | Pakulski | |
| 2016/0032170 A1* | 2/2016 | Li | C09K 8/588 166/305.1 |
| 2019/0169492 A1 | 6/2019 | Hill et al. | |
| 2021/0340429 A1* | 11/2021 | Gardner | C11D 3/22 |

FOREIGN PATENT DOCUMENTS

| | | |
|---|---|---|
| EP | 0836669 A1 | 4/1998 |
| JP | 2017071588 A | 4/2017 |
| WO | 2017099709 A1 | 6/2017 |

OTHER PUBLICATIONS

Written Opinion and International Search Report from corresponding Application No. PCT/US2023/018792 mailed Aug. 7, 2023.
Kairui Zhang, et al., Synthesis of long-chain fatty acid starch esters in aqueous medium and its characterization, European Polymer Journal, vol. 119, 2019, pp. 136-147.

* cited by examiner

*Primary Examiner* — Kumar R Bhushan
(74) *Attorney, Agent, or Firm* — Vorys, Sater, Seymour and Pease LLP (57) ABSTRACT

Surfactant compositions comprising a reaction product of a saccharide polymer and a fatty acid or a fatty ester may be obtained in an aqueous fluid in the presence of a hydroxide base and a neutral surfactant or a reaction product form thereof, the saccharide polymer comprising a dextran, a dextrin compound, or any combination thereof. One or more zwitterionic surfactants may be combined with the surfactant composition in a ratio sufficient to render the resulting combined surfactant composition brine-tolerant, even when both the reaction product and one or more of the zwitterionic surfactant(s) are brine-intolerant. The one or more zwitterionic surfactants may be further selected to render the combined surfactant composition non-emulsifying toward oleaginous fluids.

21 Claims, 1 Drawing Sheet

BRINE-TOLERANT COMPOSITIONS COMPRISING FATTY ACID OR FATTY ESTER REACTION PRODUCTS OF SACCHARIDE POLYMERS

BACKGROUND

Amphiphilic compounds having both hydrophobic and hydrophilic regions within their molecular structure are commonly referred to as "surfactants" or "surfactant compounds." By virtue of their molecular structure, surfactants tend to lower the surface tension at an interface between two components. Surfactants may be found in a wide range of consumer and industrial products including, for example, soaps, detergents, cosmetics, pharmaceuticals, and dispersants. In addition, surfactants are also commonly used in the oil and gas industry. Among other functions in these applications and others, surfactants may promote solubility of an otherwise sparingly soluble substance, increase foaming, facilitate emulsification or de-emulsification, and/or lower viscosity in particular instances.

There are difficulties associated with various conventional surfactants. Some common surfactants may be expensive, have poor aqueous solubility, exhibit poor biodegradability, and/or be subject to environmental and/or other government regulations. Some surfactants may also promote high surface tension values at the critical micelle concentration, which may complicate fluid handling when formulating consumer and industrial products containing such surfactants. In addition, many conventional surfactants are incompatible with aqueous fluids having a high salt content (e.g., about 5 wt. % salt or greater), such as various brines, and undergo precipitation when contacted therewith. A further difficulty associated with conventional surfactants is that the hydrophilic-lipophilic balance (HLB) is fixed by virtue of the molecular structure of the particular amphiphilic compound employed, which may not be suitable for a specified application, even if the surfactant is otherwise chemically compatible with anticipated use conditions.

A versatile class of bio-sourced surfactants may be obtained in an aqueous phase by combining a reaction product of a fatty acid and a saccharide polymer with a fatty acid amide neutral surfactant (co-surfactant), as described in U.S. Patent Application Publication 2021/0340429. The fatty acid and the amount thereof may be varied to tailor the hydrophilic-lipophilic balance of these types of surfactants. Low surface tension values may arise as a consequence of a synergistic interaction between the reaction product and the neutral surfactant. Although these types of surfactants may be compatible with aqueous fluids having relatively low salinity values (e.g., a salt content of about 5 wt. % or under), more highly saline aqueous fluids, such as various brines, may lead to precipitation of at least a portion of the surfactant composition. Since industrial processes and various field water sources often display high salinity values, the bio-based surfactants may be rendered incompatible for applications where they might otherwise be feasibly used.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure generally relates to surfactant technology and, more specifically, compositions formed at least in part from biologically sourced materials and that are compatible with high-salinity aqueous fluids, such as various brines.

As discussed above, conventional surfactants may present various issues such as high cost, poor biocompatibility, and/or poor solubility, which may limit their applicability in various applications. Moreover, there is no easy way to alter the hydrophobic-lipophilic balance (HLB) of conventional surfactants. Surface tension (interfacial tension) values are also frequently high for some types of surfactants as well, which may complicate their handling in various applications and/or preclude formulation thereof into various consumer and industrial products. While some conventional surfactants are compatible with high-salinity aqueous fluids, such as various brines, many are incompatible. Surfactants that are incompatible with a given brine or other high-salinity aqueous fluid may precipitate when contacted therewith, whereas the surfactant may remain soluble (compatible) when contacted with water or a low-salinity aqueous fluid. This difficulty may significantly limit the range of applications in which surfactants may be successfully used.

As described in U.S. Application Patent Publication 2021/0340429, incorporated herein by reference, aqueous surfactant compositions comprising a reaction product of a fatty acid and a saccharide polymer, such as dextran or a dextrin compound, in combination with a neutral surfactant (co-surfactant), such as various alkanolamide surfactants based on fatty acids, are a versatile class of bio-based surfactants. Not only is the hydrophilic-lipophilic balance readily altered by varying the identity and amount of the fatty acid, but surprisingly low surface tension values may be realized when the reaction product is present in combination with the neutral surfactant. Specifically, when the reaction product of a fatty acid and the saccharide polymer is present in combination with a suitable neutral surfactant, the surface tension may be lower than that of the neutral surfactant by itself at substantially the same concentration in an aqueous fluid. That is, the reaction product of the fatty acid and the saccharide polymer may interact synergistically with the neutral surfactant to afford decreased surface tension values compared to the neutral surfactant alone at a substantially identical concentration. Fatty esters may be reacted to form the reaction products under similar conditions. Although the foregoing reaction products may also be soluble and afford low surface tension values in low-salinity aqueous fluids (or fresh water), such surfactant compositions may exhibit limited compatibility with high-salinity aqueous fluids and at least partially precipitate when contacted therewith.

As used herein, the term "fatty acid" refers to a linear, optionally unsaturated, carboxylic acid containing 4 or more carbon atoms. As used herein, the term "fatty ester" refers to a compound containing one or more ester moieties, which comprises an alcohol component and one or more fatty acid components. The alcohol component may be a monohydric alcohol or a polyhydric alcohol, such as a diol or triol (e.g., glycerol). The one or more fatty acid components may comprise at least one straight chain fatty acid that is saturated or unsaturated, examples of which are provided hereinbelow. The reaction products and compositions described herein may be free or substantially free of branched fatty acids or products formed therefrom, according to various embodiments. That is, in some embodiments, the reaction products and compositions described herein may include one or more fatty acids or products formed therefrom that consist of one or more straight chain fatty acids, which may be saturated or unsaturated.

The reaction products described above may be combined with a zwitterionic (amphoteric) surfactant to afford additional surprising and beneficial advantages. Namely, the compositions described in brief above (i.e., an aqueous surfactant composition comprising a reaction product of a saccharide polymer in combination with a neutral surfactant or a reaction product form thereof, such as a fatty acid alkanolamide) may be combined with a suitable amount of zwitterionic surfactant to promote tolerance of the compositions toward high-salinity aqueous fluids, such as various brines. The zwitterionic surfactant(s) alone need not necessarily be brine-tolerant to convey brine tolerance to compositions containing the reaction products. Thus, the reaction products and the zwitterionic surfactant(s) may exhibit a further surprising synergistic interaction resulting in brine tolerance of the compositions.

Furthermore, the zwitterionic surfactant that is combined with the reaction products may be selected to promote emulsification or non-emulsification behavior when the compositions are contacted with an oleaginous substance. Amphoacetate surfactants, preferably an amphodiacetate surfactant, in suitable amounts may surprisingly convey non-emulsifying behavior when the compositions are contacted with an oleaginous substance, while still maintaining tolerance toward high-salinity aqueous fluids. Provided that the amount of the amphoacetate surfactant remains within a suitable range for conveying non-emulsifying behavior with respect to a combined amount of the reaction product and total zwitterionic surfactants, other zwitterionic surfactants may be blended with an amphoacetate surfactant while still maintaining brine tolerance. For example, another type of zwitterionic surfactant may be blended with the combination of the reaction products and an amphoacetate surfactant to maintain non-emulsification behavior while modifying the properties of the compositions still further, such as to afford decreased surface tension values relative to those realized with the amphoacetate surfactant alone.

Without being limited by theory, reaction products produced from a saccharide polymer and a fatty acid or a fatty ester may include at least one fatty ester saccharide polymer formed from a reaction between the saccharide polymer (e.g., a dextran or a dextrin compound) and the fatty acid or the fatty acid component of the fatty ester, which may then interact synergistically with a neutral surfactant to afford low surface tension values. As described herein, the reaction products may exhibit further synergism in combination with one or more zwitterionic surfactants, preferably at least one amphoacetate surfactant, to afford further features and advantages suitable for contacting the reaction products with a high-salinity aqueous fluid.

To form a fatty ester saccharide polymer, a fatty ester may undergo initial hydrolysis under alkaline conditions to generate a fatty acid component or a salt form thereof, which may then react with the saccharide polymer to form at least one fatty ester saccharide polymer reaction product. Alternately, a fatty ester may undergo direct transesterification with a saccharide polymer to form at least one fatty ester saccharide polymer reaction product. Free fatty acids or a salt form thereof, in contrast, may react directly with a saccharide polymer to form the fatty ester saccharide polymer reaction products described herein. Any one or more than one of the primary or secondary alcohol functionalities upon the glucose monomer units of the saccharide polymer may undergo a reaction to form a fatty ester saccharide polymer reaction product in the disclosure herein.

In the course of forming a fatty ester saccharide polymer reaction product from a fatty ester, such as an animal or vegetable oil, the alcohol component of the fatty ester may be released into an aqueous fluid in which the fatty ester saccharide polymer reaction product is being formed. The alcohol component may remain present with the fatty ester saccharide polymer reaction product in the aqueous fluid or undergo at least partial removal therefrom. Advantageously and surprisingly, the alcohol component released into the aqueous fluid does not significantly impact the low surface tension values attainable when the fatty ester saccharide polymer reaction product and the neutral surfactant are present together, nor does the presence of the alcohol component significantly impact the brine tolerance realized through the disclosure herein. In fact, one or more alcohols, such as methanol, ethanol or other low molecular weight alcohols, may be added to the compositions in some cases should a higher alcohol concentration be desirable. The alcohol component (e.g., glycerol) released into the aqueous fluid or added to the aqueous fluid may aid in solubilizing other components of the composition and/or other components blended with the compositions to make various consumer and industrial products. Added alcohol components may also promote the breaking process (de-emulsification) and also aid in winterizing (lowering the freezing point) of the compositions. However, it is to be appreciated that the compositions described herein may function satisfactorily even without an added alcohol component.

Thus, the reaction products of the present disclosure may be advantageous due to their substantial biological origin, low cost and ability to afford low surface tension values when present in combination with a suitable neutral surfactant. Reaction products of maltodextrin, for example, represent a particularly useful class of dextrin-based reaction products due to the low cost and convenient molecular weight range of this saccharide polymer. Various fatty acids having a range of molecular weights may be used to produce reaction products having a span of HLB values. Moreover, a number of fats, oils and similar glycerol esters may serve as convenient and inexpensive sources for a fatty ester, or fatty acids obtained therefrom, used in forming the saccharide polymer reaction products described herein. Likewise, fats, oils, similar glycerol esters, and other fatty esters, and amounts thereof may be selected to promote tailoring of the surfactant properties, such as altering HLB values and/or varying emulsification performance, for instance. As further discussed above, the combination of one or more zwitterionic surfactants with the foregoing compositions, including the choice of particular zwitterionic surfactant(s) or amount(s) thereof, may convey brine tolerance to the compositions and determine whether emulsification or non-emulsification behavior is realized when contacting an oleaginous substance.

Maltodextrins may represent an advantageous saccharide polymer for use in the disclosure herein due to their low cost, environmentally benign nature, and the relative ease with which they may be chemically reacted with various free fatty acids or fatty acids originating from a fatty ester, such as a glycerol ester. Depending on the fatty acid(s) reacted with a maltodextrin, the hydrophobic-lipophilic balance (HLB) of the reaction products may range from about 5 to about 20 or even more, wherein known molecular contributions may be utilized to calculate the HLB value. In addition to property variation resulting from the fatty acid size and amount thereof, maltodextrins are available in a range of oligomer sizes (e.g., 3-20 glucose monomers, or even up to about 25 glucose monomers), which may allow further property tailoring to be realized. Thus, maltodextrin reaction products may be adapted for use under a wide range of conditions anticipated to be present in a given application. Dextran reaction products may offer similar advantages and features to those of maltodextrin reaction products, including the ability to produce low surface tension values.

Maltodextrin and other dextrin compounds suitable for use in the present disclosure may comprise 2 to about 20 glucose monomers, or even up to about 25 glucose monomers, linked together with α(1,4) glycosidic bonds. At least a portion of the glucose monomers may form a reaction product upon being contacted under suitable conditions with a fatty acid or a fatty ester, including fatty acid salts obtained therefrom, such as a salt of a $C_4$-$C_{30}$ fatty acid or a $C_4$-$C_{20}$ fatty acid, particularly unbranched, optionally unsaturated fatty acids within this size range. Without being limited by theory, at least a portion of the glucose monomers in the dextrin compound may react to form a fatty ester dextrin compound, which may be optionally present in combination with unreacted fatty acid salt in the aqueous fluid. When formed, a fatty ester reaction product may form at any hydroxyl group of the dextrin compound, including any combination of primary and/or secondary hydroxyl groups. Hydroxyl groups upon the neutral surfactant may undergo a similar esterification reaction under the same reaction conditions.

Dextran is a saccharide polymer characterized by predominantly α(1,6) glycosidic bonds between adjacent glucose monomers, with a limited number of glucose side chains linked to the main polymer backbone via (1,3) glycosidic bonds. The α(1,3) glycosidic bonds may introduce crosslinks between adjacent saccharide polymer chains. Depending on the biological source, the extent of branching and the molecular weight of dextran may vary considerably, any of which may be utilized in the disclosure herein. At least a portion of the glucose monomers in dextran may form a reaction product upon being contacted under suitable conditions with a fatty acid or a fatty ester, including a fatty acid salt obtained therefrom, such as a salt of a $C_4$-$C_{30}$ fatty acid or a $C_4$-$C_{20}$ fatty acid, particularly unbranched, optionally unsaturated fatty acids within this size range. Without being limited by theory, at least a portion of the glucose monomers may react to form a fatty ester dextran in some embodiments, which may be optionally present in combination with unreacted fatty acid salt in the aqueous fluid. When formed, a fatty ester reaction product may form at any hydroxyl group of the dextran.

In some embodiments, reaction products of the present disclosure may include a dextrin compound having 3 to about 20 glucose monomers, or even up to about 25 glucose monomers, that are covalently linked by α(1,4) glycosidic bonds. Formula 1 below shows the generic structure of a dextrin compound having only α(1,4) glycosidic bonds between adjacent glucose monomers, wherein variable 'a' is a positive integer ranging from 1 to about 18, thereby providing a dextrin backbone with 3 to about 20 glucose monomers. In the case of a dextrin compound containing up to 25 glucose monomers, variable 'a' may range from 1 up to about 23. The terminal glucose unit is shown in its closed form, but may also be present in the corresponding reducing sugar (open chain or acyclic) form as well.

Formula 1

Other dextrin compounds may contain only α(1,6) glycosidic bonds or a mixture of α(1,4) and α(1,6) glycosidic bonds, and such dextrin compounds may also be suitable for use in forming the saccharide polymer reaction products of the present disclosure. Particularly suitable dextrins may have a molecular weight (e.g., $M_n$) in the range of about 1200 to about 1400 or about 1100 to about 1500.

In some or other embodiments, the saccharide polymer reaction products may include a dextran obtained from any suitable source. The structure of dextran is shown in Formula 2 below, in which the α(1,3) glycosidic bonds are not shown in the interest of clarity. Where they occur, the α(1,3) glycosidic bonds may append a terminal glucose monomer as a side chain to the α(1,6)-linked saccharide polymer backbone, form crosslinks between adjacent α(1,6)-linked saccharide polymer backbones, interrupt the α(1,6)-linked saccharide polymer backbone with an α(1,3) glycosidic bond, or any combination thereof. Depending on source, up to about 5% of the glucose monomers may be linked by α(1,3) glycosidic bonds. Linkage by α(1,3) glycosidic bonds may occur upon any of the glucose monomers. The numbering of a single glucose monomer is shown in Formula 3 below.

Formula 2

Suitable dextrans may have a molecular weight of about 1200, or about 1400, or about 5000 up to about 50,000,000, or about 100,000 up to about 20,000,000. As such, variable 'b' may range from about 30 to about 300,000 depending on the particular dextran selected. Particularly suitable dextrans may have a molecular weight (e.g., $M_n$) ranging from about 1200 to about 1400, or about 1100 to about 1500, or about 1000 up to about 100,000, or about 100,000 to about 1 million, or about 2 million to about 5 million, or about 5 million to about 50 million. Another suitable dextran may have a molecular weight of about 500,000 and an activity level of about 9%.

Formula 3

The saccharide polymer may comprise a maltodextrin according to some embodiments of the present disclosure. Maltodextrins may be characterized in terms of their dextrose equivalent (DE) value. Dextrose equivalent is a measure of the amount of reducing sugars (e.g., glucose monomers) that are present in a saccharide polymer, particularly a dextrin, expressed as a percentage relative to dextrose. Starch, which is functionally non-reducing, has a defined dextrose equivalent of 0, whereas dextrose itself has a dextrose equivalent of 100. Dextrose equivalent may be calculated by dividing the molecular weight of glucose by $M_n$ and multiplying the result by 100. Higher dextrose equivalent values are characteristic of a lower number of covalently linked glucose monomers (shorter polymer backbone length, thereby providing a higher relative percentage of terminal reducing sugars). Maltodextrins suitable for forming a reaction product with one or more fatty esters according to the disclosure herein may exhibit dextrose equivalent values ranging from 3 to about 25 or from 3 to about 20. In more specific embodiments, dextrose equivalent values of the maltodextrins may range from about 4.5 to about 7.0, or from about 7.0 to about 10.0, or from about 9.0 to about 12.0.

Maltodextrins suitable for forming a reaction product may be obtained from hydrolysis or pyrolysis of starch, specifically the amylose component of starch, according to some embodiments. A maltodextrin having Formula 1 may be formed by hydrolysis or pyrolysis of amylose, for example. Alternative suitable dextrins may be obtained from hydrolysis or pyrolysis of the amylopectin component of starch, in which case the dextrin may contain α(1,6) glycosidic bonds if the dextrin is obtained through hydrolysis of the amylopectin side chain. Starches from which the dextrins may be subsequently produced may be obtained from any starch source.

Accordingly, compositions of the present disclosure may comprise an aqueous fluid, a neutral surfactant or a reaction product form thereof, and a reaction product of a saccharide polymer and a fatty acid or a fatty ester, in which the saccharide polymer comprises a dextran, a dextrin compound, or any combination thereof, and the reaction product of the saccharide polymer and the fatty acid or the fatty ester and the reaction product form of the neutral surfactant, if present, are formed in the presence of an aqueous hydroxide base. One or more zwitterionic surfactants may be present in combination with the reaction products in an amount sufficient to convey tolerance of the compositions toward high-salinity aqueous fluids, such as various brines. Tolerance of the compositions toward high-salinity aqueous fluids may be evidenced by lack of precipitation of one or more components when the compositions are contacted with a high-salinity aqueous fluid. To convey tolerance toward high-salinity aqueous fluids, the amount(s) of the one or more zwitterionic surfactants may be maintained within a suitable range to promote brine tolerance, as discussed in further detail herein. Depending on the chosen zwitterionic surfactant(s) and the amount(s) thereof, the compositions described herein may be brine-tolerant and further exhibit emulsification or non-emulsification behavior.

Aqueous fluids that may be used to form the compositions disclosed herein may include, but are not limited to, water, salt water, mixtures of water and a water-miscible organic solvent, brine, or any combination thereof. Field or industrial process waters containing a high salt content may be suitably used, such as produced water from a wellbore. Compositions of the present disclosure may be formulated with an aqueous fluid that already has a high salt content, such that the composition may remain stably formulated in the presence of the high salt content (e.g., greater than 5 wt. % salt based on total mass of the aqueous fluid). Alternately, the compositions of the present disclosure may be formulated with an aqueous fluid that does lack a dissolved salt or is not considered to constitute a high salt content, and the compositions may remain salt-tolerant (brine-tolerant) when exposed to an aqueous fluid having an amount of dissolved salt considered to constitute a high salt content.

As such, the compositions disclosed herein may be further combined with a brine or be contacted with a brine. As used herein, the term "brine" refers to any aqueous salt solution having a greater amount of total dissolved salt than does seawater. In non-limiting examples, suitable brines in the disclosure herein may comprise about 5 wt. % or greater total dissolved salt, or about 7.5 wt. % or greater total dissolved salt, or about 10 wt. % or greater total dissolved salt, or about 12.5 wt. % or greater total dissolved salt, or about 15 wt. % or greater total dissolved salt. In more specific examples, the amount of total dissolved salt in a brine may range from about 7.5 wt. % to about 25 wt. %, or about 10 wt. % to about 20 wt. %, or about 7.5 wt. % to about 15 wt. %, or about 15 wt. % to about 25 wt. %, or about 20 wt. % to about 30 wt. %. Suitable brines may include monovalent brines, divalent brines, or any combination thereof. Example salts that may be present in a brine include, but are not limited to, lithium chloride, lithium bromide, sodium chloride, sodium bromide, potassium chloride, potassium bromide, rubidium chloride, rubidium bromide, magnesium chloride, magnesium bromide, calcium chloride, calcium bromide, strontium chloride, strontium bromide, zinc chloride, cesium chloride, and any combination thereof. The density and viscosity of the brines may vary accordingly in relation to the amount and identity of salts dissolved therein. Brines suitable for use herein may have a pH ranging from about 1 to about 14, or about 3 to about 12, or about 4 to about 10, or about 5 to about 9, or about 7 to about 8.

When the compositions are formulated with an aqueous fluid that is not a brine, a brine having a total dissolved salt content within any of the foregoing ranges may be contacted with the compositions while still maintaining both the reaction product of the saccharide polymer and the at least one zwitterionic surfactant in a dissolved state. Alternately, a composition formulated with a first brine may be contacted with a second brine to achieve a similar result.

Oleaginous substances that may be contacted with the compositions under high-salinity conditions (e.g., when the oleaginous substance is present within a brine-containing substance) are not believed to be particularly limited. Illustrative oleaginous substances may include, for example, petroleum, refined petroleum, diesel, natural gas, plant oils, vegetable oils, an oilfield fluid or a component thereof, or any combination thereof. Depending on the identity and amount of the one or more zwitterionic surfactants, an emulsion may or may not form upon contacting the compositions described herein with a brine-containing substance containing an oleaginous substance. If formed, the emulsion may comprise an oil-in-water or water-in-oil emulsion. Additional details regarding particular zwitterionic surfactants and amounts thereof that may lead to emulsification or non-emulsification performance are provided hereinbelow.

Illustrative fatty acids (or fatty acid components within fatty esters) that may be suitable for forming a reaction product of the present disclosure include, for example, butyric acid, valeric acid, caproic acid, enanthic acid, caprylic acid, pelabonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, trioscylic acid, lignoceric acid, pentacosylic acid, cerotic acid, carboceric acid, montanic acid, nonacosylic acid, melissic acid, crotonic acid, cervonic acid, linoleic acid, linolelaidic acid, linolenic acid, arachidonic acid, docosatetraenoic acid, myristoleic acid, palmitoleic acid, sappenic acid, vaccenic acid, paullinic acid, oleic acid, pinolenic acid, stearidonic acid, eleostearic acid, elaidic acid, gondoic acid, gadoleic acid, erucic acid, eicosenoic acid, eicosadiencoic acid, eicosatrienoic acid, eicosatetraenoic acid, docosadienoic acid, nervonic acid, mead acid, adrenic acid, the like, and any combination thereof. Any of these fatty acids or a reaction product form thereof may be present in the compositions specified herein.

Fatty esters have at least one alcohol component and at least one fatty acid component (one or more fatty acid components comprising at least one of the fatty acids mentioned above) that may be liberated under alkaline conditions used to form a reaction product with the saccharide polymer. Suitable fatty esters for forming reaction products are not believed to be particularly limited, provided that the fatty esters undergo effective hydrolysis to release an alcohol component and one or more fatty acid components of the fatty ester. Fatty acids originating from the fatty esters and suitable for forming reaction products of the present disclosure may be selected (through selection of a suitable fatty ester containing one or more desired fatty acids) to afford reaction products having a range of HLB values, such as HLB values of about 5 to about 20. Illustrative types of fatty esters are provided below. The fatty acids originating from the fatty esters may range in size from about $C_4$ to about $C_{30}$, or about $C_4$ to about $C_{20}$, or about $C_6$ to about $C_{18}$, or about $C_8$ to about $C_{24}$, particularly unbranched fatty acids within these ranges. Suitable fatty acids for forming a reaction product according to the disclosure herein may be saturated or unsaturated. When the reaction products are formed from a fatty ester sourced from plant or animal oils, at least one unsaturated fatty acid, such as oleic, linoleic or linolenic acid, may be present in the reaction product.

In some embodiments, the fatty ester used to form the reaction products may comprise a glycerol ester, wherein glycerol may also be present in compositions formed therefrom. A glycerol ester may undergo alkaline hydrolysis to liberate glycerol as an alcohol component, and up to three carboxylic acid components per glycerol alcohol component may be released for undergoing reaction with a saccharide polymer according to the disclosure herein. The carboxylic acid components released from the glycerol ester may be the same or different, and/or at least one unsaturated fatty acid may be among the carboxylic acid components, according to some embodiments of the present disclosure. Accordingly, the reaction products and compositions described herein may further contain glycerol, particularly when the compositions contain a reaction product formed from a glycerol fatty ester.

Glycerol esters suitable for forming a reaction product or composition in accordance with the present disclosure are not believed to be particularly limited and may comprise any plant oil, animal oil, plant fat, animal fat, or any combination thereof that contains one or more desired fatty acids. The glycerol ester may undergo hydrolysis or transesterification in the course of forming a reaction product with a saccharide polymer. Suitable glycerol esters may be found in plant or animal sources including, for example, soybean oil, grapeseed oil, olive oil, palm oil, rice bran oil, safflower oil, corn oil, coconut oil, sunflower seed oil, canola oil, rapeseed oil, peanut oil, cottonseed oil, hazelnut oil, tea seed oil, linseed oil, sesame oil, acai oil, almond oil, beech nut oil, brazil nut oil, cashew oil, macadamia nut oil, pecan oil, pine nut oil, pistachio oil, walnut oil, pumpkin seed oil, apricot oil, avocado oil, grapefruit oil, lemon oil, orange oil, mango oil, flax seed oil, fish oil, cocoa butter, hemp oil, castor oil, tall oil, fish oil, cattle fat, buffalo fat, sheep fat, goat fat, duck fat, pig fat, poultry fat, and any combination thereof.

Soybean oil, for example, contains a mixture of saturated and unsaturated fatty acids, predominantly palmitic acid, stearic acid, oleic acid, linoleic acid, and linolenic acid, with the monounsaturated and polyunsaturated fatty acids (oleic acid, linoleic and linolenic acids) comprising a majority of the fatty acids obtainable from the soybean oil. Palm oil contains about 50% saturated fatty acids (palmitic acid, stearic acid, and myristic acid) and 50% unsaturated fatty acids (oleic acid, linoleic acid, and linolenic acid). Coconut oil contains predominantly saturated fatty acids (caprylic acid, capric acid, lauric acid, myristic acid, palmitic acid, and stearic acid) and less than 10% unsaturated fatty acids (oleic acid and linoleic acid). These mixtures of fatty acids represent particular examples of fatty acid mixtures that may be present in the reaction products and compositions described herein. It is to be appreciated that compositions of the present disclosure are not limited to the foregoing mixtures of fatty acids, however.

When glycerol esters are used as a direct (in situ) source of fatty acids for formation of reaction products of the present disclosure, glycerol may be present in the compositions and products resulting therefrom. Optionally, the glycerol may be at least partially removed from the aqueous fluid of the compositions or products, if desired. Otherwise, the amount of glycerol present in the compositions and products may be dictated by the amount of glycerol ester that is present when forming the reaction product. For example, for glycerol esters containing $C_8$-$C_{24}$ fatty acids, particularly unbranched fatty acids in this size range, the weight percentage of glycerol in the glycerol esters may range from about 7 wt. % to about 17 wt. %, based on total mass of the glycerol ester used for forming the saccharide polymer reaction product. Accordingly, the corresponding weight percentages of glycerol in compositions containing the reaction product, as measured relative to the fatty acid(s) originating from the glycerol upon alkaline hydrolysis, may range from about 7.5 wt. % to about 20 wt. %. Alternately, the weight percentage of glycerol in the compositions may be substantially equivalent on a mass basis, with respect to the entirety of the composition, to the weight percentage of glycerol ester present in the reaction mixture, since each glycerol ester may release one glycerol molecule into the composition upon undergoing complete hydrolysis. It is to be appreciated, however, that additional glycerol may be added to compositions beyond that liberated upon converting a glycerol fatty ester into a reaction product formed from a saccharide polymer, or glycerol may be further added to compositions containing a reaction product prepared directly from a fatty acid.

In addition or as an alternative to glycerol, one or more additional alcohols may be present in the compositions described herein. In non-limiting examples, the one or more additional alcohols may comprise one or more $C_1$-$C_{12}$, or $C_1$-$C_8$, or $C_1$-$C_4$ monohydric or dihydric alcohols. Non-limiting examples of suitable alcohols may include, but are not limited to, methanol, ethanol, 1-propanol, isopropanol, 1-butanol, 2-butanol, t-butanol, 1-pentanol, 2-pentanol, 3-pentanol, 2-methyl-1-butanol, 2-methyl-2-butanol, cyclopentanol, cyclohexanol, ethylene glycol, propylene glycol, and the like. When present, the one or more additional alcohols may be present at about 10 wt. % or less, or about 5 wt. % or less, or about 2 wt. % or less with respect to the entire mass of the composition.

Suitable hydroxide bases for forming the reaction products may include, for example, alkali metal hydroxides, such as sodium hydroxide, potassium hydroxide, or any combination thereof. A stoichiometric excess or a stoichiometric deficit of the hydroxide base relative to an amount of the fatty ester or fatty acid may be present.

A molar ratio of fatty acid or fatty acid originating from a fatty ester to glucose monomers in the reaction product may be about 0.05 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.08 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.1 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.2 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.3 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.4 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.5 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.6 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.7 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.8 or above on a basis of $\text{moles}_{fatty\ acid\ or\ fatty\ acid\ in\ fatty\ ester}$ : $\text{moles}_{glucose\ monomers\ in\ saccharide\ polymer}$, or about 0.9 or above on a basis of $\text{moles}_{fatty\ acid\ or\ fatty\ acid\ in\ fatty\ ester}$ : $\text{moles}_{glucose\ monomers\ in\ saccharide\ polymer}$. A maximum ratio of fatty acid to dextrin or dextran in the reaction product, based upon glucose monomers, may be about 1.0 in most cases, although molar ratios above 1.0 also reside within the scope of the present disclosure. Thus, in some embodiments, the molar ratio of fatty acid to glucose monomers in the reaction product of the saccharide polymer may range from about 0.05 $\text{moles}_{fatty\ acid\ or\ fatty\ acid\ in\ fatty\ ester}$ : $\text{moles}_{glucose\ monomers\ in\ saccharide\ polymer}$ to about 1.0 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.9 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.8 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.7 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.6 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.5 $\text{moles}_{fatty\ acid\ or\ fatty\ acid\ in\ fatty\ ester}$ : $\text{moles}_{glucose\ monomers\ in\ saccharide\ polymer}$, or about 0.05 $\text{moles}_{fatty\ acid\ or\ fatty\ acid\ in\ fatty\ ester}$ : $\text{moles}_{glucose\ monomers\ in\ saccharide\ polymer}$ to about 0.4 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ in\ fatty\ ester}$ : $\text{moles}_{glucose\ monomers\ in\ saccharide\ polymer}$ to about 0.9 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ in\ fatty\ ester}$ : $\text{moles}_{glucose\ monomers\ in\ saccharide\ polymer}$ to about 0.8 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ in\ fatty\ ester}$ : $\text{moles}_{glucose\ monomers\ in\ saccharide\ polymer}$ to about 0.7 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ in\ fatty\ ester}$ : $\text{moles}_{glucose\ monomers\ in\ saccharide\ polymer}$ to about 0.6 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ in\ fatty\ ester}$ : $\text{moles}_{glucose\ monomers\ in\ saccharide\ polymer}$ to about 0.5 $\text{moles}_{fatty\ acid\ or\ fatty\ acid\ in\ fatty\ ester}$ : $\text{moles}_{glucose\ monomers\ in\ saccharide\ polymer}$, or about 0.1 $\text{moles}_{fatty\ acid\ or\ fatty\ acid\ or\ fatty\ acid\ in\ fatty\ ester}$ : $\text{moles}_{glucose\ monomers\ in\ saccharide\ polymer}$ to about 0.4 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.9 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.8 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.7 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.6 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.5 $\text{moles}_{fatty\ acid\ or\ fatty\ acid\ in\ fatty\ ester}$ : $\text{moles}_{glucose\ monomers\ in\ saccharide\ polymer}$, or about 0.2 $\text{moles}_{fatty\ acid\ or\ fatty\ acid\ in\ fatty\ ester}$ : $\text{moles}_{glucose\ monomers\ in\ saccharide\ polymer}$ to about 0.4 $\text{moles}_{fatty\ acid\ or\ fatty\ acid\ in\ fatty\ ester}$ : $\text{moles}_{glucose\ monomers\ in\ saccharide\ polymer}$, or about 0.3

$\frac{\text{moles}_{fatty\ acid\ or\ fatty\ acid\ in\ fatty\ ester}}{\text{moles}_{glucose\ monomers\ in\ saccharide\ polymer}}$ to about 0.9 $\frac{\text{moles}_{fatty\ acid\ or\ fatty\ acid\ in\ fatty\ ester}}{\text{moles}_{glucose\ monomers\ in\ saccharide\ polymer}}$, or about 0.3 $\frac{\text{moles}_{fatty\ acid\ or\ fatty\ acid\ in\ fatty\ ester}}{\text{moles}_{glucose\ monomers\ in\ saccharide\ polymer}}$ to about 0.8 $\frac{\text{moles}_{fatty\ acid\ or\ fatty\ acid\ in\ fatty\ ester}}{\text{moles}_{glucose\ monomers\ in\ saccharide\ polymer}}$, or about 0.3 $\frac{\text{moles}_{fatty\ acid\ or\ fatty\ acid\ in\ fatty\ ester}}{\text{moles}_{glucose\ monomers\ in\ saccharide\ polymer}}$ to about 0.7 $\frac{\text{moles}_{fatty\ acid\ or\ fatty\ acid\ in\ fatty\ ester}}{\text{moles}_{glucose\ monomers\ in\ saccharide\ polymer}}$, or about 0.3 $\frac{\text{moles}_{fatty\ acid\ or\ fatty\ acid\ in\ fatty\ ester}}{\text{moles}_{glucose\ monomers\ in\ saccharide\ polymer}}$ to about 0.6 $\frac{\text{moles}_{fatty\ acid\ or\ fatty\ acid\ in\ fatty\ ester}}{\text{moles}_{glucose\ monomers\ in\ saccharide\ polymer}}$, or about 0.3 $\frac{\text{moles}_{fatty\ acid\ or\ fatty\ acid\ in\ fatty\ ester}}{\text{moles}_{glucose\ monomers\ in\ saccharide\ polymer}}$ to about 0.5 $\frac{\text{moles}_{fatty\ acid\ or\ fatty\ acid\ in\ fatty\ ester}}{\text{moles}_{glucose\ monomers\ in\ saccharide\ polymer}}$, or about 0.3 $\frac{\text{moles}_{fatty\ acid\ or\ fatty\ acid\ in\ fatty\ ester}}{\text{moles}_{glucose\ monomers\ in\ saccharide\ polymer}}$ to about 0.4 $\frac{\text{moles}_{fatty\ acid\ or\ fatty\ acid\ in\ fatty\ ester}}{\text{moles}_{glucose\ monomers\ in\ saccharide\ polymer}}$, or about 0.4 $\frac{\text{moles}_{fatty\ acid\ or\ fatty\ acid\ in\ fatty\ ester}}{\text{moles}_{glucose\ monomers\ in\ saccharide\ polymer}}$ to about 0.9 $\frac{\text{moles}_{fatty\ acid\ or\ fatty\ acid\ in\ fatty\ ester}}{\text{moles}_{glucose\ monomers\ in\ saccharide\ polymer}}$, or about 0.4 $\frac{\text{moles}_{fatty\ acid\ or\ fatty\ acid\ in\ fatty\ ester}}{\text{moles}_{glucose\ monomers\ in\ saccharide\ polymer}}$ to about 0.8 $\frac{\text{moles}_{fatty\ acid\ or\ fatty\ acid\ in\ fatty\ ester}}{\text{moles}_{glucose\ monomers\ in\ saccharide\ polymer}}$, or about 0.4 $\frac{\text{moles}_{fatty\ acid\ or\ fatty\ acid\ in\ fatty\ ester}}{\text{moles}_{glucose\ monomers\ in\ saccharide\ polymer}}$ to about 0.7 $\frac{\text{moles}_{fatty\ acid\ or\ fatty\ acid\ in\ fatty\ ester}}{\text{moles}_{glucose\ monomers\ in\ saccharide\ polymer}}$, or about 0.4 $\frac{\text{moles}_{fatty\ acid\ or\ fatty\ acid\ in\ fatty\ ester}}{\text{moles}_{glucose\ monomers\ in\ saccharide\ polymer}}$ to about 0.6 $\frac{\text{moles}_{fatty\ acid\ or\ fatty\ acid\ in\ fatty\ ester}}{\text{moles}_{glucose\ monomers\ in\ saccharide\ polymer}}$, or about 0.4 $\frac{\text{moles}_{fatty\ acid\ or\ fatty\ acid\ in\ fatty\ ester}}{\text{moles}_{glucose\ monomers\ in\ saccharide\ polymer}}$ to about 0.5 $\frac{\text{moles}_{fatty\ acid\ or\ fatty\ acid\ in\ fatty\ ester}}{\text{moles}_{glucose\ monomers\ in\ saccharide\ polymer}}$. The foregoing ratios may represent a molar ratio of fatty acid reacted with the dextran or dextrin compound. One or more hydroxyl groups per glucose monomer may undergo a reaction in some cases, particularly at a molar ratio of about 1.0 or above. At least a portion of the glucose monomers may remain unfunctionalized, particularly at lower molar ratios. Unreacted fatty acids, if any, may remain in the reaction product as a fatty acid salt of the hydroxide base.

As such, reaction products of the present disclosure may comprise one or more fatty ester dextrins and/or one or more fatty ester dextrans, optionally in further combination with a fatty acid salt (e.g., an alkali metal carboxylate), and/or a hydroxide base (e.g., an alkali metal hydroxide base). When using a fatty ester to form the reaction products, the hydroxide base may be present in at least a sufficient molar quantity to react with at least a portion of the fatty ester to promote hydrolysis thereof and to convert the fatty acid component of the fatty ester into a fatty acid salt (e.g., an alkali metal carboxylate) for reaction with the saccharide polymer. Alternately, the hydroxide base may be present in a sufficient amount to form a fatty acid salt (e.g., an alkali metal carboxylate) when forming the reaction products directly from a free fatty acid. The alcohol component released from a fatty ester (e.g., glycerol) following hydrolysis may be present in combination with any of the reaction products as well. The hydroxide base may be neutralized with an acid or be at least partially removed through washing, and compositions comprising the reaction products may retain a low surface tension following neutralization or washing. The alcohol component, if present, may be at least partially removed from the reaction products and compositions as well, if desired, such as through distillation or solvent extraction, for example.

Alternately, other saccharide polymers may be utilized to form the reaction products in the compositions described herein. Other saccharide polymers that may be used in this regard include, but are not limited to, glycogen, guar, xanthan, welan, scleroglucan, chitosan, schizophyllan, levan, pectins, inulin, arabinoxylans, pullulan, gellan, carrageenan, chitosan, chitin, cellulose, starch, or a combination thereof. Saccharide polymer fragments obtained from the foregoing and containing about 3 to about 25 monomers per fragment may also be utilized for forming the reaction products and compositions described herein.

In some embodiments and preferably, the reaction products of the present disclosure may promote lowering of the surface tension of the neutral surfactant, preferably a fatty acid alkanolamide neutral surfactant in an aqueous fluid. That is, the reaction products may be present in an effective concentration in the aqueous fluid to lower the surface tension of the neutral surfactant compared to that of the neutral surfactant alone at a substantially similar concentration in the aqueous fluid.

At the same time, the neutral surfactant or a reaction product form thereof may be present in the aqueous fluid in a sufficient concentration to solubilize the saccharide polymer prior to forming the reaction product and the reaction product of the saccharide polymer and the fatty acid or fatty ester after a reaction has taken place. In the compositions of the present disclosure, the neutral surfactant may be present at a concentration of about 20 wt. % or less, or about 10 wt. % or less, or about 5 wt. % or less, such as about 1 wt. % to about 10 wt. %, or about 3 wt. % to about 8 wt. %, each based on total mass of the composition.

Suitable neutral surfactants may comprise one or more fatty acid alkanolamide surfactants. Fatty acid alkanolamide surfactants that may have their surface tension lowered in combination with a reaction product of the present disclosure include cocamide-based surfactants, such as cocamide diethanolamine, cocamide monoethanolamine, cocamide monoisopropanolamine, cocamide diisopropanolamine, and the like. Cocamide diethanolamine (CocoDEA) or cocamide diisopropanolamine (CocoDIPA) may be particularly suitable neutral surfactants for use in the disclosure herein. Other fatty acid amide alkanolamines (alkanolamides), such as palmitic acid amide diethanolamine, palmitic acid monoethanolamine, or palmitic acid diisopropanolamine may also be suitable for use in the disclosure herein.

Zwitterionic surfactants (also known as amphoteric surfactants) suitable for use in the disclosure herein to promote brine tolerance are not believed to be particularly limited in structure and may be selected from betaines and sultaines. Suitable betaines may include an amphoacetate surfactant, such as an amphodiacetate surfactant, or any combination thereof, any of which may be used in further combination with other betaines, sultaines, or any combination thereof. When other betaines are present in combination with an amphoacetate surfactant, the other betaines may comprise a surfactant that is not an amphoacetate surfactant. Formula 4A shows the structure of an amphoacetate surfactant, and Formula 4B shows the structure of an amphodiacetate surfactant (R=a hydrocarbyl group from a fatty acid).

Particular examples of zwitterionic surfactants that may be suitable for use herein include, for example, cocamidopropylbetaine, alkanoyl hydroxysultaines (e.g., lauryl hydroxysultaine), cocamidopropyl hydroxysultaine, alkanamidopropyl hydroxysultaines (e.g., lauramidopropyl hydroxysultaine), sodium cocoamphohydroxypropylsulfonate, sodium cocoamphoacetate, disodium cocoamphodiacetate, and the like. In more specific examples, sodium cocoamphoacetate and/or disodium cocoamphodiacetate may be present in the compositions described herein in combination with any one or more of the other betaine and/or sultaine surfactants specified above.

In more specific examples, compositions of the present disclosure may comprise at least one amphoacetate, at least one amphodiacetate, or any combination thereof. Any of the foregoing may be in further combination with at least one betaine (preferably a betaine that is not an amphoacetate or amphodiacetate), at least one sultaine (e.g., a hydroxysultaine), or any combination thereof.

The one or more zwitterionic surfactants may be present in the compositions in any amount sufficient to convey brine tolerance to the compositions. More specifically, a volume ratio of the one or more zwitterionic surfactants with respect to a volume of the reaction product of the saccharide polymer and the fatty acid or fatty ester or a combined volume of the one or more zwitterionic surfactants and the reaction product of the saccharide polymer and the fatty acid or the fatty ester may be sufficient to make the compositions brine-tolerant.

In some or other non-limiting examples, the one or more zwitterionic surfactants may be present at a volume ratio with respect to the reaction products ranging from about 0.2 or above, or about 0.3 or above, or about 0.4 or above, or about 0.5 or above, or about 0.6 or above, or about 0.7 or above, or about 0.8 or above, or about 0.9 or above, such as ranging from about 0.2 to about 1.6, or about 0.25 to about 0.75, or about 0.4 to about 0.7, or about 1.0 to about 1.5. When at least one amphoacetate, such as an amphodiacetate, or any combination thereof is present in a sufficient quantity to render the compositions non-emulsifying toward oleaginous fluids, the volume ratio of the at least one amphoacetate to total zwitterionic surfactants plus reaction product of the saccharide polymer (i.e., the sum of total zwitterionic surfactants plus the reaction product of the saccharide polymer) may range from about 0.1 to about 0.35, or about 0.1 to about 0.30, or about 0.12 to about 0.3, or about 0.15 to about 0.2, or about 0.16 to about 0.28, or about 0.2 to about 0.3. In further non-limiting examples, the amphoacetate may be present at a concentration by volume of about 15 vol. % or less, or about 10 vol. % or less, or about 5 vol. % or less, or about 2.5 vol. % or less, or about 1 vol. % or less, or about 0.5 vol. % or less, each based on total volume of the composition.

Once formed, the pH of compositions described herein may reside within a range of about 1 to about 14, such as a range of about 1 to about 5, or about 5 to about 7, or about 7 to about 9, or about 9 to about 14. The pH may be raised or lowered, if needed, after forming the reaction products in accordance with the disclosure herein and/or after combining the one or more zwitterionic surfactants therewith. Lower surface tension values may be realized as the pH decreases in some instances.

Reaction products of the present disclosure, which may include those formed through a reaction of one or more fatty acids or one or more fatty esters with a dextrin compound and/or a dextran, may be prepared by a process comprising: heating a saccharide polymer comprising a dextran, a dextrin compound (e.g., comprising 3 to about 20 glucose monomers, or even up to about 25 glucose monomers, linked together with $\alpha(1,4)$ glycosidic bonds, such as maltodextrin), or any combination thereof, a fatty acid or a fatty ester, a neutral surfactant (e.g., a fatty acid alkanolamide) and a hydroxide base in an aqueous fluid, and obtaining a reaction product of the saccharide polymer and the fatty acid or fatty ester in the aqueous fluid. The aqueous fluid may further contain glycerol, which may originate from a fatty ester used to form the reaction products and/or additional glycerol or one or more other alcohols may be added separately to the reaction products. The reaction product may be present in the aqueous fluid at a concentration effective to lower a surface tension of the neutral surfactant, as measured relative to the neutral surfactant alone at a like concentration in the aqueous phase. For example, a 5 wt. % solution of the neutral surfactant in water may have a higher surface tension than does a composition containing 5 wt. % of the neutral surfactant in combination with a reaction product of the present disclosure in a surface tension-lowering amount. Any of the reaction products of a dextran or a dextrin compound may constitute a suitable saccharide polymer for forming compositions having a low surface tension and further comprising at least one zwitterionic surfactant to promote brine tolerance according to the disclosure herein. Heating may be conducted at a temperature of about 100° C. or less, such as at about 50° C. to about 80° C., or about 60° C. to about 70° C., or about 50° C. to about 60° C.

In the presence of a neutral surfactant, surface tension values for reaction products of the present disclosure may be about 40 dynes/cm or less, or about 38 dynes/cm or less, or about 36 dynes/cm or less, or about 34 dynes/cm or less, or about 32 dynes/cm or less, or about 30 dynes/cm or less, or about 28 dynes/cm or less. Alternately, the surface tension values may be lowered up to about 40% relative to the surface tension of the neutral surfactant in the aqueous fluid alone at a like concentration, or lowered up to about 30%, or lowered up to about 20%, or lowered up to about 15%, or lowered up to about 10%. In a particular example, the surface tension values may be lowered in an amount of about 10% to about 25%, or about 10% to about 20%, or about 15% to about 25%, as measured relative to the surface tension of the neutral surfactant in the aqueous fluid alone at a substantially identical concentration to that in a composition containing the reaction product.

In forming the reaction products described herein, methods of the present disclosure may comprise combining the fatty acid or the fatty ester, the hydroxide base, and the neutral surfactant in water to form a mixture, and heating the mixture until the fatty acid or the fatty ester dissolves (e.g., by undergoing hydrolysis and/or forming a fatty acid salt) and a homogeneous mixture forms. The saccharide polymer may be combined with the fatty acid or the fatty ester during this process, or the saccharide polymer may be combined with the homogeneous mixture after formation thereof. Once the saccharide polymer is present in the homogeneous mixture, heating may be continued until the reaction product has formed to a sufficient degree. The resulting aqueous phase may be utilized directly in further applications, optionally after concentration, neutralization, or dilution, or by being further combined with additional components targeted for a particular formulation, such as the compositions disclosed herein. Formulations and products in which compositions of the present disclosure may be utilized are discussed hereinbelow. In some instances, the compositions may at least partially replace another surfactant in a specific formulation, such as a charged surfactant. In other instances, the compositions may at least partially replace an ethoxylated alcohol surfactant in a formulation.

Subterranean Treatment Operations

The recovery of hydrocarbon resources, such as oil and gas, from subterranean formations is often performed in conjunction with introducing one or more subterranean treatment chemicals downhole. As used herein, the terms "treat," "treatment," "treating," and grammatical equivalents thereof refer to any compound, fluid, or combination thereof that is introduced to a subterranean formation with the goal of achieving a desired function and/or for a desired purpose. A suitable treatment chemical or a treatment fluid may be selected based upon particular conditions present or anticipated to be present downhole.

Reaction products of the present disclosure, including those formed from maltodextrin, other dextrin compounds, or dextran may be formulated as a subterranean treatment fluid containing one or more zwitterionic surfactants. Treatment fluids may be used in a variety of subterranean treatment operations to facilitate or promote a desired outcome within the subterranean formation. As used herein, the term "treatment fluid" refers to any fluid used in a subterranean treatment operation in conjunction with achieving a desired function and/or for a desired purpose. Unless otherwise specified, use of the term "treatment fluid" does not imply any particular action by the treatment fluid or a component thereof. Illustrative treatment operations that may be facilitated through use of the reaction products and compositions of the present disclosure include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, diversion operations, and the like. Any of these treatment operations may feature emulsification, de-emulsification, a change in surface wetting characteristics downhole, or any combination thereof.

As used herein, the term "drilling operation" refers to the process of forming a wellbore in a subterranean formation. As used herein, the term "drilling fluid" refers to a fluid used in drilling a wellbore.

As used herein, the term "stimulation operation" refers to an activity conducted within a wellbore to increase production therefrom. As used herein, the term "stimulation fluid" refers to a fluid used downhole during a stimulation activity to increase production of a hydrocarbon resource from the subterranean formation. In some instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls. For example, a composition of the present disclosure may promote liberation of a hydrocarbon resource from a subterranean formation to promote wellbore cleanup by changing surface wetting characteristics. In another embodiment, treatment fluids comprising a composition of the present disclosure may be introduced to a subterranean formation in emulsified form and undergo a subsequent break (de-emulsification) therein to promote a desired action within the subterranean formation. In still other embodiments, the treatment fluids may promote de-emulsification of a fluid downhole, such as an emulsified hydrocarbon resource.

As used herein, the term "fracturing operation" refers to a high-pressure operation that creates or extends a plurality of flow channels within a subterranean formation. As used herein, the term "fracturing fluid" refers to a viscosified fluid used in conjunction with a fracturing operation. A plurality of proppant particulates may be present in a fracturing fluid to maintain the flow channels created or extended in the fracturing operation in an open state.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, such as an acid-soluble material that comprises at least a portion of the subterranean formation. As used herein, the term "acidizing fluid" refers to a fluid used during an acidizing operation. Mineral acids, such as hydrochloric acid or hydrobromic acid, or organic acids may be present in compositions utilized for acidizing a carbonate formation, whereas hydrofluoric acid may be present in compositions utilized for acidizing a siliceous formation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore of a well.

Compositions of the present disclosure may also be used in conjunction with enhanced oil recovery (EOR) operations. When used in conjunction with EOR operations, the reaction products of the present disclosure may change surface wetting within a subterranean formation to promote recovery of a hydrocarbon resource therefrom.

In any of the foregoing treatment operations, the treatment fluid may be foamed. Foamed fracturing fluids, for example, may be advantageous compared to viscosified treatment fluids for delivery of proppant particulates to a location in a wellbore. When foamed, treatment fluids may have a foam quality ranging from about 1% to about 99%. Incorporation of a zwitterionic surfactant within a composition may further aid the foaming process.

Compositions of the present disclosure may be present in any of the treatment fluids discussed above. Treatment fluids of the present disclosure may feature a concentration of the compositions of about 0.1 gallons per thousand gallons (gpt) to about 10 gpt, or about 0.1 gpt to about 1 gpt, or about 0.2 gpt to about 0.5 gpt. These concentrations correspond to volume/volume percentages ranging from about 0.01% to about 1%, or from about 0.01% to about 0.1%, or from 0.02% to about 0.05%. The chosen concentration may vary depending upon the particular requirements for a given treatment operation and/or the specific subterranean conditions that are encountered downhole. In some examples, the reaction product may be present in a concentration effective to lower a surface tension for a neutral surfactant also present in the treatment fluid.

Treatment fluids containing the reaction products of the present disclosure may optionally further comprise any number of additives that may be used in the oilfield services industry. Illustrative additives that may be present in a treatment fluid in combination with the reaction products of the present disclosure include, for example, surfactants, viscosifiers, gelling agents, gel stabilizers, anti-oxidants, polymer degradation prevention additives, relative permeability modifiers, scale inhibitors, corrosion inhibitors, chelating agents, foaming agents, defoaming agents, anti-foaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

Other Products

The compositions of the present disclosure comprising a reaction product of a dextrin compound, a dextran, or any combination thereof with a fatty acid or fatty ester may be formulated in a wide range of industrial or consumer products in which surfactants may be used. Personal care products may represent a beneficial class of products in which the compositions of the present disclosure may be present, given the relative benign nature of the biomolecules present in the compositions disclosed herein. Illustrative industrial and consumer products in which the foregoing may be present are provided further below.

Adjuvants are compositions that are used in combination with an active substance to increase the efficacy or potency of the active substance. In non-limiting examples, the active substance may be a pharmaceutical compound, a personal care compound, or an agricultural compound.

The compositions of the present disclosure may be present in adjuvant compositions in which surfactants of various types may be used. The foregoing may replace a surfactant used in an adjuvant composition or be used in combination with a surfactant already present in an adjuvant composition. Within an adjuvant composition, the compositions may be present in an amount of about 0.01 wt. % to about 20 wt. % of the adjuvant composition as a whole, or about 0.1 wt. % to about 10 wt. %, or about 1 wt. % to about 15 wt. %, or about 5 wt. % to about 20 wt. %.

An active compound may be present in the adjuvant compositions, or an adjuvant composition may be administered separately from an active compound. When administered separately, the adjuvant compositions may be administered before or after the active compound.

Examples of suitable additional components that may be present in adjuvant compositions containing a reaction product of the present disclosure include, but are not limited to, other surfactants, anti-foam compounds, particulates, metal oxides (e.g., silica, alumina, titania, zirconia, and the like), electrolytes, salts, organic solvents, wetting agents, dispersants, emulsifying agents, de-emulsifying agents, penetrants, preservatives, colorants, acids, bases, buffers, chelating agents, viscosifiers, thixotropic agents, stabilizers, film-forming agents, plasticizers, preservatives, antioxidants, and the like, including any combination thereof. Other surfactants that may be present in the adjuvant compositions are not particularly limited and may include any one or a combination of cationic, anionic, neutral or zwitterionic surfactants.

Foaming agents are compositions that are a stabilized dispersion of a large volume of gas in the form of bubbles of varying sizes in a relatively small volume of liquid, or compositions that may form a foam upon suitable introduction of gas thereto (foamable formulations).

The compositions of the present disclosure may be present in foaming agents in which surfactants of various types may be used. The foregoing may replace a surfactant used in a foaming agent or be used in combination with a surfactant already present in a foaming agent. Within a foaming agent, the compositions may be present in an amount of about 0.01 wt. % to about 20 wt. % of the foaming agent as a whole, or about 0.1 wt. % to about 10 wt. %, or about 1 wt. % to about 15 wt. %, or about 5 wt. % to about 20 wt. %.

Foaming agents may contain any combination of cationic surfactants, anionic surfactants, zwitterionic surfactants, or neutral surfactants. The compositions disclosed herein may be present in a foaming agent in combination with any of cationic surfactants, anionic surfactants, zwitterionic surfactants, neutral surfactants or any two or more of these surfactants. Alternately, the compositions disclosed herein may replace all or a portion of any one or more of these surfactants in a foaming agent. The compositions may replace a sulfosuccinate surfactant or be used in combination with a sulfosuccinate surfactant in some foaming agent embodiments, for example.

Examples of suitable additional components that may be present in foaming agents containing a composition of the present disclosure include, but are not limited to, other surfactants, amines (any one or a combination of primary amines, secondary amines, tertiary amines, diethanolamine, triethanolamine, ethoxylated amines and amidoamines), foam boosters such as amine oxides, solvents, water, salts, skin conditioners (e.g., ethylhexylglycerin, hydroxyethylurea, urea, panthenol, glycerin, isopropyl myristate, propylene glycol, tocopheryl acetate, and polyquaternium-11), moisturizers, liquefied gases, supercritical gases, acids, bases, salts, buffers, chelating agents, and the like, including any combination thereof. Suitable examples of these additional components will be familiar to one having ordinary skill in the art. Other surfactants that may be present in the foaming agents are not particularly limited and may include any one or a combination of cationic, anionic, neutral or zwitterionic surfactants.

Hard surface cleaners are compositions that may be used to remove various substances from surfaces like glass, metals, plastics, stone, concrete, and the like. Hard surfaces that may be cleaned with hard surface cleaners include, for example, windows, countertops, appliances, floors, driveways, toilets, showers and bathtubs, sinks, and the like. Substances removable from these types of hard surfaces and others span a wide range and include, but are not limited to, dirt, grease, soap scum, limescale and similar hard water deposits, and the like.

The compositions of the present disclosure may be present in hard surface cleaners in which surfactants of various types may be used. The foregoing may replace a surfactant used in a hard surface cleaner or be used in combination with a surfactant already present in a hard surface cleaner. Within a hard surface cleaner, the compositions may be present in an amount of about 0.01 wt. % to about 20 wt. % of the hard surface cleaner as a whole, or about 0.1 wt. % to about 10 wt. %, or about 1 wt. % to about 15 wt. %, or about 5 wt. % to about 20 wt. %.

Examples of suitable additional components that may be present in hard surface cleaners containing a reaction product of the present disclosure include, but are not limited to, other surfactants, foaming compounds, anti-foam compounds, salts such as alkali metal carbonates, organic solvents such as glycols or glycol ethers, wetting agents, dispersants, emulsifying agents, de-emulsifying agents, colorants, acids, bases, buffers, chelating agents, anti-streaking agents, alkanolamines, and the like, including any combination thereof. Other surfactants that may be present in the hard surface cleaners are not particularly limited and may be any one or a combination of cationic, anionic, neutral or zwitterionic surfactants.

Skin creams and lotions are compositions that may moisturize or otherwise improve the appearance of skin. Skin creams and lotions are inclusive of gels formulated for application to the skin, which may have a higher viscosity than creams or lotions.

The compositions of the present disclosure may be present in skin creams and lotions in which surfactants may be used. The foregoing may replace a surfactant used in a skin cream or lotion or be used in combination with a surfactant already present in a skin cream or lotion. Within a skin cream or lotion, the compositions may be present in an amount of about 0.01 wt. % to about 20 wt. % of the skin cream or lotion as a whole, or about 0.1 wt. % to about 10 wt. %, or about 1 wt. % to about 15 wt. %, or about 5 wt. % to about 20 wt. %.

Examples of suitable additional components that may be present in skin creams or lotions disclosed herein include, but are not limited to, other surfactants, emulsifiers, essential oils, waxes, fats, solvents, viscosifying agents, mono-alcohols, diols, polyols, diol and polyol ethers, milk proteins, emollients, humectants, skin conditioners, preservatives, acids, bases, buffers, chelating agents, thickeners, vitamins, lubricants, wrinkle reducers, moisturizers, radical inhibitors and other antioxidants, Vitamin A, Vitamin E, ceramides, fatty acids, fatty esters, fatty alcohols, hyaluronic acid, sodium pyroglutamic acid, glycerin, aloe vera, fragrances, colorants, preservatives, sunscreens, and the like, including any combination thereof. Other surfactants that may be present in the skin creams and lotions are not particularly limited and may be any one or a combination of cationic, anionic, neutral or zwitterionic surfactants. The reaction products may replace at least a portion of one or more existing surfactants in a skin cream or lotion or supplement a quantity of one or more existing surfactants in a skin cream or lotion.

Body washes and shampoos are cleansing compositions formulated for application to the skin or hair. Liquid soaps for more generalized personal cleansing are similar in composition to some body washes and shampoos and may be formulated with many of the same components.

The compositions of the present disclosure may be present in body washes, shampoos, and liquid soaps in which surfactants may be used. The foregoing may replace a surfactant used in a body wash, shampoo, or liquid soap, or be used in combination with a surfactant already present in a body wash, shampoo or liquid soap. Within a body wash, shampoo, or liquid soap, the compositions may be present in an amount of about 0.01 wt. % to about 20 wt. % of the body wash, shampoo, or liquid soap as a whole, or about 0.1 wt. % to about 10 wt. %, or about 1 wt. % to about 15 wt. %, or about 5 wt. % to about 20 wt. %.

Examples of suitable additional components that may be present in body washes, shampoos, or liquid soaps disclosed herein include, but are not limited to, other surfactants, conditioners, amidoamines, fragrances, colorants, essential oils, foaming agents, humectants, fatty acids, fatty esters, fatty alcohols, waxes, biocides, soaps, preservatives, acids, bases, buffers, chelating agents, thickeners, vitamins, pearlizing agents, viscosifying agents, moisturizers, antioxidants, sunscreens, and the like, including any combination thereof. Illustrative examples of body washes, shampoos, and liquid soaps may comprise water, an effective amount of the compositions, optionally in further combination with another surfactant, 0-4% pearlizing agent, 0-1% suspension aids, 0-2% fragrance, 0-0.25% chelating agent, 0-1% preservatives, 0-2% colorant and 0-25% conditioner. Other surfactants that may be present in the body washes, shampoos, and liquid soaps are not particularly limited and may be any one or a combination of cationic, anionic, neutral or zwitterionic surfactants.

Sunscreens are substances that may be applied to the skin to afford protection from the sun. Sunscreens may be formulated as creams or with a suitable wax base in "stick" format for application to the skin.

The compositions of the present disclosure (e.g., a reaction product of a dextrin or dextran and a fatty ester, as specified above, in combination with a neutral surfactant or a zwitterionic surfactant) may be present in sunscreens in which surfactants may be used. The foregoing may replace a surfactant used in a sunscreen or be used in combination with a surfactant already present in a sunscreen. Within a sunscreen, the compositions may be present in an amount of about 0.01 wt. % to about 20 wt. % of the sunscreen as a whole, or about 0.1 wt. % to about 10 wt. %, or about 1 wt. % to about 15 wt. %, or about 5 wt. % to about 20 wt. %.

Examples of suitable additional components that may be present in sunscreens include, but are not limited to, other surfactants, conditioners, titanium dioxide, zinc oxide, organic UV absorbers, film forming agents, solvents, aerosol propellants, waxes, fats, oils, moisturizers, fragrances, colorants, essential oils, fatty acids, fatty esters, fatty alcohols, preservatives, acids, bases, buffers, chelating agents, thickeners, insect repellents, skin conditioners, and the like, including any combination thereof. Other surfactants that may be present in the sunscreens are not particularly limited and may be any one or a combination of cationic, anionic, neutral or zwitterionic surfactants.

Organic UV absorbers that may be present in a sunscreen in combination with the compositions include, but are not limited to, para-aminobenzoic acid, avobenzone, cinoxate, dioxybenzone, homosalate, menthyl anthranilate, octyl salicylate, oxybenzone, padimate O, phenylbenzimidazole sulfonic acid, trolamine sulisobenzone, salicylate, diethanolamine methoxycinnamate, digalloy trioleate, ethyl dihydroxypropyl PABA, glyceryl aminobenzoate, lawsone with dihydroxyacetone, red petrolatum, ethylhexyl triazone, dioctyl butamido triazone, benzylidene malonate polysiloxane, terephthalylidene dicamphor sulfonic acid, disodium phenyl dibenzimidazole tetrasulfonate, diethylamino hydroxybenzoyl hexyl benzoate, bis diethylamino hydroxybenzoyl benzoate, bis benzoxazoylphenyl ethylhexylimino triazine, drometrizole trisiloxane, methylene bis-benzotriazolyl tetramethylbutylphenol, and bis-ethylhexyloxyphenol methoxyphenyltriazine, 4-methylbenzylidenecamphor, isopentyl 4-methoxycinnamate, phenylbenzimidazole sulfonate, 2-hydroxy-4-methoxy benzophenone-5-sulfonate, 4-(2-beta-glucopyrano-siloxy) propoxy-2-hydroxybenzophenone, bis-sodium phenylene-1,4-bis(2-benzimidazyl)-3,3'-5,5'-tetrasulfonate, 2-ethylhexyl-p-methoxycinnamate, 4-tert-4'-methoxydibenzoylmethane, octocrylene, 2,4-bis-[{4-(2-ethythexyloxy)-2-hydroxy}-phenyl]-6-(4-methoxyphenyl)-1,3,5-triazine, methylene bis-benzotriazolyl tetrarnethyl butylphenol, 2,4,6-tris-[4-(2-ethylhexyloxycarbonyl) anilino]-1,3,5-triazine, diethylamino hydroxybenzoyl hexyl benzoate, oxybenzone, and dihydroxy dimethoxy benzophenone, and mixtures thereof.

Still other organic UV absorbers that may be suitable for inclusion in a sunscreen include, but are not limited to, bis-resorcinyl triazines; benzimidazole derivatives; 4-methylbenzylidene camphor; benzoyl piperazine derivatives; benzoxazole derivatives; diarylbutadiene derivatives; phenyl benzotriazole derivatives; benzylidene malonates; TEA-salicylate; imidazoline derivatives; naphthalates; merocyanine aminobenzophenone derivatives; dibenzoylmethane derivatives; β,β-diphenylacrylate derivatives; camphor derivatives; salicylate derivatives; anthranilate derivatives; and benzalmalonate derivatives.

In addition to formulations that are sunscreens alone, the compositions of the present disclosure may be present in sunscreens that are incorporated into other products such as lotions, cologne, cosmetics, body washes and shampoos, and the like.

Hair gels and hair sprays are formulations that may be used for holding one's hair in place, or optionally to provide detangling of one's hair. Hair sprays are aerosolized formations, whereas gels are high-viscosity fluids and may be applied by hand.

The compositions of the present disclosure may be present in hair sprays and hair gels in which surfactants may be used. The foregoing may replace a surfactant used in a hair spray or hair gel or be used in combination with a surfactant already present in a hair spray or hair gel. Within a hair spray or hair gel, the compositions may be present in an amount of about 0.01 wt. % to about 20 wt. % of the hair gel or hair spray as a whole, or about 0.1 wt. % to about 10 wt. %, or about 1 wt. % to about 15 wt. %, or about 5 wt. % to about 20 wt. %.

Examples of suitable additional components that may be present in hair sprays or hair gels include, but are not limited to, other surfactants, cellulose-based biopolymers, water-soluble polymers, polyalkylene glycols, polyalkylene glycol esters, conditioning agents, emollients, humectants, emulsifiers, opacifying agents, thickening agents, foam stabilizers, viscosity builders, sequestrates, antioxidants, antidandruff agents, suspending agents, proteins, fragrances, sunscreens, botanical extracts, essential oils, fatty acids, fatty esters, fatty alcohols, preservatives, acids, bases, buffers, chelating agents, thickeners, vitamins, waxes, oils, aerosol propellants, polyvinylpyrrolidone, polyvinyl acetate, vinyl acetate-crotonic acid copolymers, acrylic acid copolymers, plasticizers, alcohols, and the like, including any combination thereof. Other surfactants that may be present in the hair sprays and hair gels are not particularly limited and may be any one or a combination of cationic, anionic, neutral or zwitterionic surfactants.

One or more examples of a hair spray or hair gel may comprise a composition of the present disclosure and one or more of cetearyl alcohol, cyclopentasiloxane, behentrimonium chloride, dimethicone, ethylhexyl isononanoate, behenyl alcohol, meadowfoam seed oil, cyclohexasiloxane, olive fruit oil, *Prunus amygdalus dulcis*, stearamidopropyl dimethylamine, behentrimonium methosulfate, amodimethicone, panthenol, glycol stearate, ceteth-2, hydroxyethylcellulose, phenoxyethanol, methylparaben, propylparaben, citric acid, mica, titanium dioxide, iron oxide, fragrance, or any combination thereof.

One or more examples of a hair spray or hair gel may comprise a composition of the present disclosure and one or more of cyclomethicone, jojoba ester, dimethicone copolyol, nonfat dry milk, soy protein, stearic acid, capric/caprylic stearic triglyceride, jojoba oil, hybrid sunflower oil, cetearyl alcohol, glyceryl stearate, PEG-40 stearate, aloe vera gel, acrylates/$C_{10-30}$ alkyl acrylate crosspolymer, propylene glycol, tocopheryl acetate, methylparaben, propylparaben, fragrance, or any combination thereof.

Cosmetics are formulations that may be used for altering or improving one's physical appearance. Illustrative cosmetics include, but are not limited to, lipstick, blush, mascara, foundation, eyeliner, and the like. Forms of cosmetics may include, for example, emulsions, creams, gels, dispersions, sticks, and the like. Suitable emulsions within cosmetics may include oil-in-water or water-in-oil emulsions.

The compositions of the present disclosure may be present in various types of cosmetics in which surfactants may be used. The foregoing may replace a surfactant used in a cosmetic or be used in combination with a surfactant already present in a cosmetic. Within a cosmetic, the compositions may be present in an amount of about 0.01 wt. % to about 20 wt. % of the cosmetic as a whole, or about 0.1 wt. % to about 10 wt. %, or about 1 wt. % to about 15 wt. %, or about 5 wt. % to about 20 wt. %.

Examples of suitable additional components that may be present in cosmetics include, but are not limited to, other surfactants, perfumes, preservatives, coloring materials, UV absorbers, moisture-retaining agents, emulsifiers, gelling agents, oils, thickening agents, foam stabilizers, viscosity builders, preservatives, sequestrates, antioxidants, suspending agents, proteins, fragrances, sunscreens, botanical extracts, essential oils, fats (e.g., shea butter, mango seed butter, and cacao seed butter), fatty acids, fatty esters, fatty alcohols, biocides, soaps, preservatives, acids, bases, buffers, chelating agents, thickeners, vitamins, waxes (e.g., myristyl myristate, *Camellia sinensis* leaf extract, jojoba, sunflower seed, carnauba wax, candelilla wax, and beeswax), and the like, including any combination thereof. Some examples of components that may be present in cosmetics may include, for example, higher fatty alcohols such as cetyl alcohol, stearyl alcohol and behenyl alcohol; higher fatty acids, including caprylic/capric triglyceride, lauric acid, myristic acid, palmitic acid and stearic acid; hydrocarbons including ceresin; natural oils including meadowfoam seed oil, sunflower seed oil, macadamia seed oil, green tea seed oil, ginger oil, ginseng oil, coconut oil, olive oil and camellia oil; esters including phytosteryl/octyldodecyl lauroyl glutamate, isostearyl isostearate, methylheptyl isostearate, dicaprylyl carbonate and isopropyl palmitate; ethers including dicaprylyl ether; silicone oils including dimethicone, cyclopentasiloxane, cyclohexasiloxane, phenyltrimethicone, trisiloxane and methyltrimethicone; and hydrocarbons including squalane. Other surfactants that may be present in the cosmetics are not particularly limited and may be any one or a combination of cationic, anionic, neutral or zwitterionic surfactants. Cosmetics of the present disclosure may be formulated in any suitable form including, sticks, creams, powders, gels, and the like.

Deodorants and antiperspirants are formulations that may be utilized for controlling body odor. Deodorants and antiperspirants of the present disclosure may be formulated in stick form, gel form, powder form or aerosolizable form.

The compositions of the present disclosure may be present in deodorants and antiperspirants in which surfactants may be used. The foregoing may replace a surfactant used in a deodorant or antiperspirant or be used in combination with a surfactant already present in a deodorant or antiperspirant. Within a deodorant or antiperspirant, the compositions may be present in an amount of about 0.01 wt. % to about 20 wt. % of the deodorant or antiperspirant as a whole, or about 0.1 wt. % to about 10 wt. %, or about 1 wt. % to about 15 wt. %, or about 5 wt. % to about 20 wt. %.

Examples of suitable additional components that may be present in deodorants or antiperspirants disclosed herein include, but are not limited to, other surfactants, aluminum salts (e.g., alum, aluminum chloride, aluminum chlorohydrate, aluminum-zirconium compounds, aluminum-zirconium tetrachlorohydrex gly, and aluminum-zirconium tetrachlorohydrex gly), anti-bacterial agents, parabens, alcohols, propylene glycol, hexamethylenetetramine, acids, bases, buffers, chelating agents, perfumes, preservatives, coloring materials, moisture-absorbing agents (desiccants), emulsifiers, gelling agents, oils, thickening agents, foam stabilizers, viscosity builders, sequestrates, antioxidants, suspending agents, fragrances, essential oils, fats, fatty acids, fatty esters, fatty alcohols, waxes, and the like, including any combination thereof. Other surfactants that may be present in the deodorants and antiperspirants are not particularly limited and may be any one or a combination of cationic, anionic, neutral or zwitterionic surfactants. Deodorants and antiperspirants of the present disclosure may be formulated in any suitable form including, sticks, creams, powders, gels, and the like.

The compositions of the present disclosure may also find exemplary uses and formulations outside the personal care space as well. In addition to the oilfield applications described above, the compositions of the present disclosure may be incorporated in applications in which metal sequestration from a fluid is needed, such as within froth floatation processes. Froth floatation processes may be conducted in various instances, such as mining runoff or wastewater treatment. In such applications, the compositions of the present disclosure may replace a surfactant used in froth floatation or be used in combination with a surfactant already present in froth floatation process. Within a given froth floatation process, the compositions may be present in an amount of about 0.01 wt. % to about 20 wt. % of a froth floatation fluid as a whole, or about 0.1 wt. % to about 10 wt. %, or about 1 wt. % to about 15 wt. %, or about 5 wt. % to about 20 wt. %.

In some examples, the compositions of the present disclosure may be utilized in roughers and cleaner circuits to promote clay dispersion, water conditioning, additive enhancement and/or emulsification of metal suppressants such as Mn and Fe. Any conventional frothing agent may be utilized in combination with the compositions disclosed herein. Suitable frothing agents and details concerning frothing agents will be familiar to one having ordinary skill in the art.

Embodiments disclosed herein include:

A. Compositions containing reaction products of saccharide polymers. The compositions comprise: an aqueous fluid; a neutral surfactant or a reaction product form thereof; a reaction product of a saccharide polymer and a fatty acid or a fatty ester, the saccharide polymer comprising a dextran, a dextrin compound, or any combination thereof, and the reaction product of the saccharide polymer and the fatty acid or the fatty ester and the reaction product form of the neutral surfactant, if present, being formed in the presence of an aqueous hydroxide base; and one or more zwitterionic surfactants; wherein a volume ratio of the one or more zwitterionic surfactants with respect to a combined volume of the one or more zwitterionic surfactants and the reaction product of the saccharide polymer and the fatty acid or the fatty ester is sufficient to make the composition brine-tolerant.

A1. Subterranean treatment fluids comprising the composition of A.

A2. Personal care products comprising the composition of A.

B. Methods for compatibilizing a composition with a brine. The methods comprise: providing the composition of A; and contacting the composition with a brine-containing substance.

C. Methods for forming a brine-tolerant composition. The methods comprise: providing at least one zwitterionic surfactant; providing an aqueous surfactant composition comprising a reaction product of a saccharide polymer and a fatty acid or a fatty ester in an aqueous fluid, the aqueous surfactant composition also comprising a neutral surfactant or a reaction product form thereof; and combining the at least one zwitterionic surfactant and the aqueous surfactant composition with a brine to form a combined surfactant composition; wherein a volume ratio of the one or more zwitterionic surfactants with respect to a combined volume of the one or more zwitterionic surfactants and the reaction product of the saccharide polymer and the fatty acid or the fatty ester is sufficient to make the combined surfactant composition brine-tolerant.

Embodiments A, A1, A2, B and C may comprise one or more of the following additional embodiments in any combination.

Element 1: wherein the composition is non-emulsifying toward oleaginous fluids.

Element 1A: wherein the brine-containing substance comprises an oleaginous material.

Element 1B: wherein the oleaginous material comprises petroleum, natural gas, an oilfield fluid, or any combination thereof.

Element 2: wherein the one or more zwitterionic surfactants comprise at least one amphoacetate, at least one amphodiacetate, or any combination thereof.

Element 3: wherein the one or more zwitterionic surfactants further comprise at least one betaine, at least one sultaine, or any combination thereof.

Element 4: wherein the one or more zwitterionic surfactants comprise at least one amphoacetate, at least one amphodiacetate, or any combination thereof, and a volume ratio of the at least one amphoacetate, at least one amphodiacetate, or any combination thereof with respect to the combined volume of the one or more zwitterionic surfactants and the reaction product of the saccharide polymer and the fatty acid or the fatty ester ranges from about 0.1 to about 0.3.

Element 5: wherein the volume ratio of the at least one amphoacetate, at least one amphodiacetate, or any combination thereof with respect to the combined volume of the one or more zwitterionic surfactants and the reaction product of the saccharide polymer and the fatty acid or the fatty ester ranges from about 0.2 to about 0.3.

Element 6: wherein the one or more zwitterionic surfactants further comprise at least one betaine, at least one sultaine, or any combination thereof.

Element 7: wherein the reaction product is formed from a fatty ester, and the reaction product further comprises glycerol.

Element 8: wherein the fatty ester comprises a glycerol ester comprising up to three types of carboxylic acids each having about 4 to about 30 carbon atoms.

Element 9: wherein the reaction product is formed from at least one fatty acid having about 4 to about 30 carbon atoms.

Element 10: wherein the neutral surfactant or the reaction product form thereof is present in a sufficient concentration to solubilize the reaction product of the saccharide polymer and the fatty acid or the fatty ester in the aqueous fluid.

Element 11: wherein the saccharide polymer comprises a dextrin compound, and the dextrin compound comprises a maltodextrin.

Element 12: wherein the maltodextrin has a dextrose equivalent value of about 3 to about 25.

Element 13: wherein the reaction product of the saccharide polymer comprises a fatty ester saccharide polymer reaction product.

Element 14: wherein the neutral surfactant comprises a fatty acid alkanolamide.

Element 15: wherein the fatty acid alkanolamide comprises a compound selected from the group consisting of cocamide diethanolamine, cocamide monoethanolamine, cocamide diisopropanolamine, palmitic amide diethanolamine, palmitic amide monoethanolamine, palmitic amide diisopropanolamine, and any combination thereof.

Element 16: wherein the aqueous fluid comprises a brine.

By way of non-limiting example, exemplary combinations applicable to A, A1, A2, B and C include, but are not limited, to: 1 or 1A, and 2; 1 or 1A, 2 and 3; 1 or 1A, and 4; 1 or 1A, 4 and 5; 1 or 1A, and 4-7; 1 or 1A, and 7 or 9; 1 or 1A, and 10; 1 or 1A, and 11; 1 or 1A, and 13; 1 or 1A, and 14; 1 or 1A, 14 and 15; 1 or 1A, and 16; 2 and optionally 3, and 4; 2 and optionally 3, and 4 and 5; 2 and optionally 3, and 7 or 9; 2 and optionally 3, and 10; 2 and optionally 3, and 11; 2 and optionally 3, and 13; 2 and optionally 3, and 14; 2 and optionally 3, and 14 and 15; 2 and optionally 3, and 16; 4, or 4 and 5, or 4-7, and 7 or 9; 4, or 4 and 5, or 4-7, and 10; 4, or 4 and 5, or 4-7, and 11; 4, or 4 and 5, or 4-7, and 13; 4, or 4 and 5, or 4-7, and 14; 4, or 4 and 5, or 4-7, and 14 and 15; 4, or 4 and 5, or 4-7, and 16; 10 and 11; 10 and 13; 10 and 14; 10, and 14 and 15; 10 and 16; 11 and 13; 11 and 14; 11, and 14 and 15; 11 and 16; 13 and 14; 13 and 14 and 15; 13 and 16; 14 and 15; 14 and 16; and 15 and 16.

To facilitate a better understanding of the disclosure herein, the following examples of various representative embodiments are given. In no way should the following examples be read to limit, or to define, the scope of the invention.

Examples

Example 1: Representative Procedure for Preparation of Maltodextrin Reaction Products Using a Glycerol Ester. 25.00 g fatty acid alkanolamide surfactant and 10.00 g KOH (45% active solution) were combined in water. The reaction mixture was mechanically stirred and heated to 65° C. Thereafter, soybean oil and 150.0 g maltodextrin (MAL-TRIN M100, Grain Processing Corporation, Muscatine, Iowa; DE=9.0-12.0) as a 30% active solution were added to the reaction mixture. The amount of soybean oil was selected to provide a HLB of either 12 or 16 upon formation of a reaction product. The amount of water was selected to provide a surfactant concentration of 5 wt. %, a fatty ester (oil) concentration of 2.5 wt. %, and a maltodextrin concentration of 10 wt. %, based on all reaction components. Once the maltodextrin dissolved, heating was discontinued and stirring was conducted until the reaction mixture reached room temperature. The resulting aqueous phase containing the reaction products was used without further processing for the additional testing below. Dextran reaction products may be formed using a similar procedure. Other fatty esters and alkanolamide surfactants may be used similarly.

Example 2: Representative Procedure for Preparation of Maltodextrin Reaction Products Using Free Fatty Acids. 25.00 g fatty acid alkanolamide surfactant and 10.00 g KOH (45% active solution) were combined in water. The reaction mixture was mechanically stirred and heated to 65° C. Thereafter, a fatty acid mixture containing saturated fatty acids, including lauric acid and myristic acid as main components, and 150.0 g maltodextrin (MALTRIN M100, Grain Processing Corporation, Muscatine, Iowa; DE=9.0-12.0) as a 30% active solution were added to the reaction mixture. The amount of the fatty acid mixture was selected to provide a HLB of either 12 or 16. The amount of water was selected to provide a surfactant concentration of 5 wt. %, a fatty acid concentration of 2.5 wt. %, and a maltodextrin concentration of 10 wt. %, based on all reaction components. Once the maltodextrin dissolved, heating was discontinued and stirring was conducted until the reaction mixture reached room temperature. The resulting aqueous phase containing the reaction products was used without further processing for the additional testing below. Dextran reaction products may be formed using a similar procedure. Other fatty esters and alkanolamide surfactants may be used similarly.

Preparation of Brine-Tolerant Compositions. The as-made reaction products prepared as above were further formulated with various zwitterionic surfactants as specified in Table 1 below. After mixing the zwitterionic surfactant(s) with the as-made reaction products, the combined compositions containing mixed surfactants were contacted with a 120K synthetic brine at a dose of 1 gpt (gallons per thousand gallons). The 120K synthetic brine had the following composition: (g/L of each component): $CaCl_2$ (16.540), NaCl (103.730), $MgCl_2$ (4.230), $NaHCO_3$ (0.830), $BaCl_2$ (0.180), $Na_2SO_4$ (0.740), $SrCl_2$ (0.180), and $FeCl_3$ (0.030). Entries indicated as not forming a precipitate upon being contacted with the brine were considered to be brine-tolerant.

TABLE 1

| Sample | Example 2 Rxn. Product (Vol. %) | Zwitterionic Surfactant(s) (Vol. %) | $CH_3OH$ (Vol. %) | Water (Vol. %) | ADA: (TZS + Rxn. Product) (vol. ratio) | 120K Brine Result |
|---|---|---|---|---|---|---|
| 1 (control) | 100% | — | — | — | — | ppt. |
| 2 (control) | — | SOPALTERIC DSC 90 LV[a] 100% | — | — | — | ppt. |
| 3 | 7.66% | SOPALTERIC DSC 90 LV[a] 3.03% | 0.91% | 88.40% | 0.28 | no ppt. |
| 4 | 10% | SOPALTERIC DSC 90 LV[a] 5% SOPALTERIC CBS[b] 2.5% | 2.5% | 80% | 0.29 | no ppt. |
| 5 | 7.31% | SOPALTERIC DSC 90 LV[a] 2.19% | 0.91% | 89.59% | 0.22 | no ppt. |
| 6 | 10% | SOPALTERIC DSC 90 LV[a] 5% SOPALEX F50[c] 2.5% | 2.5% | 80% | 0.29 | no ppt. |
| 7 | 13.51% | SOPALTERIC DSC 90 LV[a] 4.05% | 1.35% | 81.09% | 0.23 | no ppt. |
| 8 | 18.01% | SOPALTERIC DSC 90 LV[a] 10.76% SOPALEX F50[c] 16.13% | 1.34% | 54% | 0.24 | no ppt. |
| 9 | 22.73% | SOPALTERIC DSC 90 LV[a] 4.55% DAXX BETAINE[d] 9.09% | — | 63.63% | 0.13 | ppt. |
| 10 | 22.73% | SOPALTERIC DSC 90 LV[a] 4.55% SOPALEX F50[c] 9.09% | — | 63.63% | 0.17 | no ppt. |
| 11 | 22.73% | SOPALTERIC DSC 90 LV[a] 4.55% SOPALEX 360[e] 9.09% | — | 63.63% | 0.13 | hazy |
| 12 | 10.96% | SOPALTERIC DSC 90 LV[a] 5.48% | 1.37% | 82.19% | 0.33 | ppt. |
| 13 | 13.51% | SCT-140[f] 4.05% | 1.35% | 81.09% | — | ppt. |

ADA = amphodiacetate by volume
TZS = total zwitterionic surfactants by volume
[a] disodium cocoamphodiacetate, 48-52% active solution (Southern Chemical)
[b] cocamidopropyl hydroxysultaine, 48-52% active solution (Southern Chemical)
[c] cocamidopropyl betaine, 37-42% active solution, pH = 4.5-5.5 (Southern Chemical)
[d] cocamidopropyl betaine, 29-31% active solution, pH = 4-6 (Daxx)
[e] cocamidopropyl betaine, 34-37% active solution, pH = 6-7.5 (Southern Chemical)
[f] potassium cocoate, 38-40% active solution (Southern Chemical)

As shown, neither the reaction product of Example 2 nor the SOPALTERIC DSC 90 LV amphoteric surfactant alone were compatible with the synthetic brine, as both components formed a precipitate when contacting the brine. In contrast, when the reaction product and the amphodiacetate were combined together in an appropriate ratio, optionally in the presence of other zwitterionic surfactants, no precipitation occurred. Thus, the reaction product and the amphoteric surfactant may unexpectedly work together synergistically to promote brine tolerance.

A composition containing sodium amphoacetate (otherwise identical to Sample 3) was similarly brine tolerant, whereas the sodium amphoacetate by itself was not.

Emulsification Performance. Each sample in Table 1 was also contacted with oil (Wolfcamp A oil) to determine its performance toward promoting emulsification. Emulsification was performed at room temperature by combining and shaking 50 mL of sample and 50 mL of oil by hand for 60 seconds at a rate of about 2 shakes per second. The resulting emulsions were immediately poured into a graduated cylinder, and time-lapse photography was used to record the level of the water layer, the oil layer, and the remaining emulsion layer over a 30-minute observation time. Samples 3 and 4 from Table 1 achieved a near-complete break after 15 minutes. Emulsion breaking was slow for Sample 7, and Sample 8 did not break within the observation time.

The composition containing sodium amphoacetate (otherwise identical to Sample 3) similarly afforded a break in the 120K brine, although the phase separation was not as crisp as in the corresponding amphodiacetate composition (Sample 3). The emulsification performance of Sample 3 was also tested in fresh water. In fresh water, a break still occurred, but considerably more slowly than in the 120K brine.

Surface Tension Measurements. Surface tension (ST) measurements for Samples 3 and 4 were conducted in various brines using a Bolin Scientific Tensiometer at room temperature. Testing was conducted by combining the sample with the various brines or a fresh water control at a loading of 1 gpt or 2 gpt and measuring the surface tension as a function of time. In addition to the 120K brine specified above, the following synthetic brines were tested: 60K, 30K, and 15K. The lower concentration brines were prepared by diluting the 120K brine. Two representative oilfield waters were also tested under similar conditions, the compositions for which are specified below.

Figure 1:
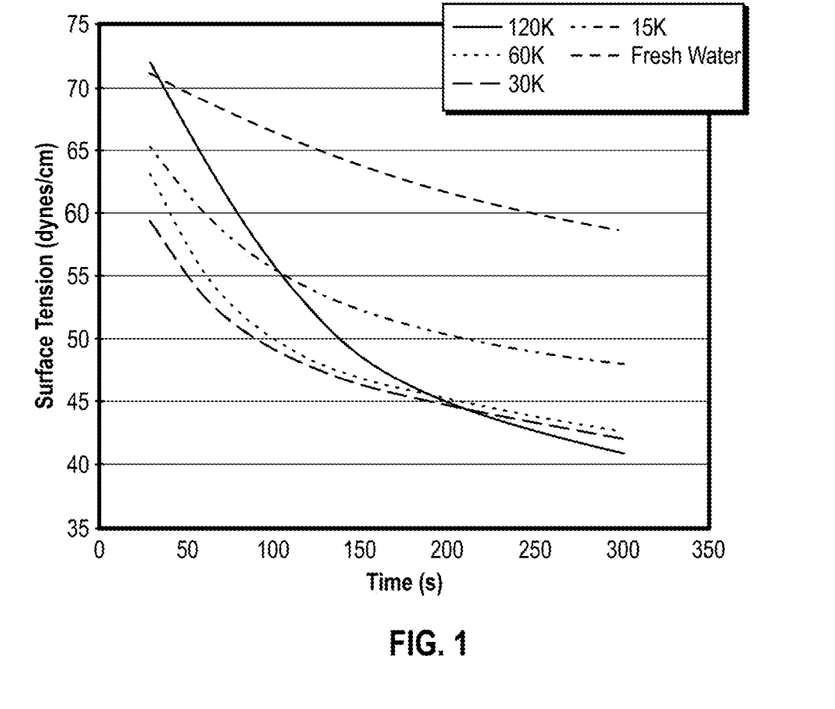
FIG. 1 is a plot of surface tension as a function of time for Sample 3 at 1 gpt in combination with various brines and fresh water.
Figure 2:
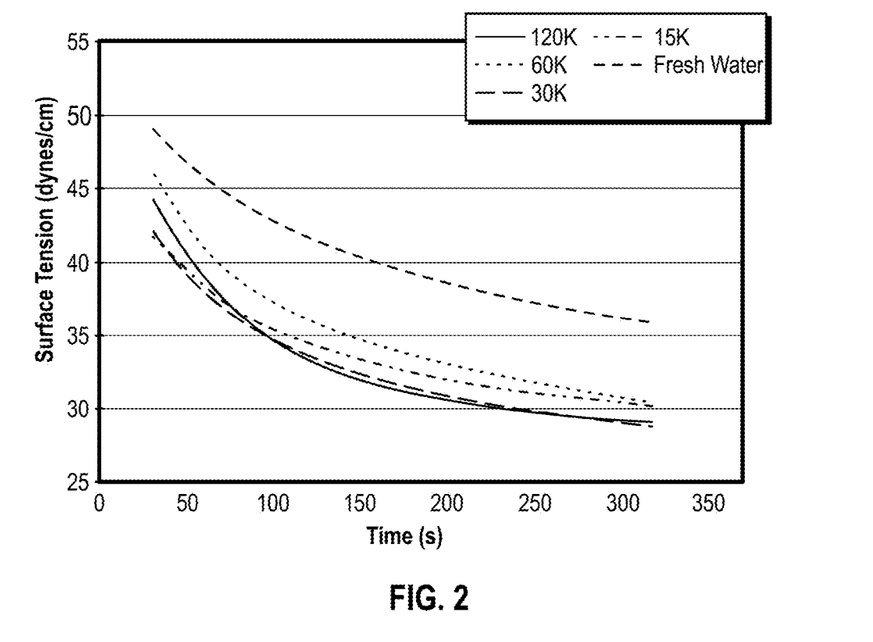
FIG. 2 is a plot of surface tension as a function of time for Sample 4 at 1 gpt in combination with various brines and fresh water.

FIG. 1 is a plot of surface tension as a function of time for Sample 3 at 1 gpt in combination with various brines and fresh water. As shown, the surface tension decreased as a function of time, with the rate of decrease beginning to slow at about 300 seconds. Surprisingly, fresh water exhibited the highest surface tension values when combined with the surfactant samples than did the various brines, in spite of the high salt concentrations of the latter. Because of their high salt content, brines are expected to exhibit a higher surface tension than does deionized water. FIG. 2 is a plot of surface tension as a function of time for Sample 4 at 1 gpt in combination with various brines and fresh water. Similar performance was observed for this surfactant composition as well, with the various brines affording a surface tension decreased by about 5 dynes/cm or more in comparison to fresh water when combined with the surfactant composition.

Surface tension testing of Samples 3 and 4 was also conducted in other synthetic brines and various field waters at surfactant loadings of 1 gpt and 2 gpt, and the performance was compared to that of two industry-standard non-emulsifying surfactants. Intrafacial tension (IFT) and contact angle were also measured and compared to the industry-standard surfactants. IFT measurements were performed using a hook needle syringe to form a drop of oil (Wolfcamp A oil) in water at 0.5, 1.0, and 2.0 gpt. The IFT value was determined using a Young-Laplace analysis. Table 2 below summarizes the surface tension and IFT values of the various samples (ST=surface tension, dynes/cm; IFT=intrafacial tension, dynes/cm).

TABLE 2

|  | Tap Water | | 120K Brine | | 60K Brine | | 70K Produced Brine | | Frac Pit Water | |
| --- | --- | --- | --- | --- | --- | --- | --- | --- | --- | --- |
|  | ST | IFT | ST | IFT | ST | IFT | ST | IFT | ST | IFT |
| Control | 72.3 | 15.1 | 74.1 | 11.4 | 74.1 | 11.4 | 73.6 | 13.2 | 69.9 | 13.8 |
| Sample 3 (0.5 gpt) | 71.7 | 11.2 | 53.1 | 8.3 | 65.3 | 8.8 | — | — | — | — |
| Sample 3 (1 gpt) | 66.4 | 10.6 | 48.1 | 6.7 | 54.2 | 5.5 | 51.8 | 7.1 | 58.3 | 9.3 |
| Sample 3 (2 gpt) | 53.6 | 9.9 | 38.4 | 3.9 | 41.8 | 3.5 | — | — | — | — |
| Sample 4 (0.5 gpt) | 64.1 | 10.2 | 46.8 | 5.7 | 54.5 | 4.7 | — | — | — | — |
| Sample 4 (1 gpt) | 51.2 | 6.5 | 40.0 | 2.9 | 41.7 | 1.9 | 37.8 | 1.5 | 44.3 | 2.8 |
| Sample 4 (2 gpt) | 38.8 | 1.8 | 31.3 | <0.8 | 32.2 | <0.8 | — | — | — | — |
| Std. 1 (1 gpt) | 46.9 | 8.7 | 44.1 | 5.7 | 37.6 | 5.6 | 38.8 | 2.6 | 38.2 | 2.8 |
| Std. 2 (1 gpt) | 34.6 | 2.8 | 31.4 | 3.9 | 31.2 | 1.2 | 29.6 | 2.3 | 28.4 | <0.8 |

As shown, Samples 3 and 4 afforded greater surface tension reduction for the brine samples than for fresh water. In addition, the samples remained active for lowering surface tension and intrafacial tension for field waters as well. The 70K produced brine had a pH of 5.9 and contained 5540 mg/L $Ca^{2+}$, 1312 mg/L $Mg^{2+}$, 19000 mg/L $Na^+$, 145 mg/L $K^+$, and 42760 mg/L $Cl^-$. The frac pit water had a pH of 8.1 and contained 4 mg/L $Ba^{2+}$, 91 mg/L $Ca^{2+}$, 86.7 mg/L $Mg^{2+}$, <53 mg $Na^+$, <1 mg/L $K^+$, 20 mg/L Cl, 68 mg/L $SO_4^{2-}$, 93 mg/L $HCO_3^-$, and 216 mg/L acetate.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, compositions, tools and methods are described herein in terms of "comprising" various components or steps, the systems, compositions, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, compositions, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, compositions, tools and methods illustratively disclosed herein may suitably be practiced in the absence of any element that is not specifically disclosed herein and/or any optional element disclosed herein. While systems, compositions, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A composition comprising:
   an aqueous fluid;
   a neutral surfactant or a reaction product form thereof;
   a reaction product of a saccharide polymer and a fatty acid or a fatty ester, the saccharide polymer comprising a dextran, a dextrin compound, or any combination thereof, and the reaction product of the saccharide polymer and the fatty acid or the fatty ester and the reaction product form of the neutral surfactant, if present, being formed in the presence of an aqueous hydroxide base;
   one or more $C_{1-4}$ alkyl alcohols; and
   one or more zwitterionic surfactants;
   wherein a volume ratio of the one or more zwitterionic surfactants with respect to a combined volume of the one or more zwitterionic surfactants and the reaction product of the saccharide polymer and the fatty acid or the fatty ester is sufficient to make the composition brine-tolerant;
   wherein the composition is non-emulsifying toward oleaginous fluids.

2. The composition of claim 1, wherein the one or more zwitterionic surfactants comprise at least one amphoacetate, at least one amphodiacetate, or any combination thereof.

3. The composition of claim 2, wherein the one or more zwitterionic surfactants further comprise at least one betaine, at least one sultaine, or any combination thereof.

4. The composition of claim 1, wherein the one or more zwitterionic surfactants comprise at least one amphoacetate, at least one amphodiacetate, or any combination thereof, and a volume ratio of the at least one amphoacetate, the at least one amphodiacetate, or any combination thereof with respect to the combined volume of the one or more zwitterionic surfactants and the reaction product of the saccharide polymer and the fatty acid or the fatty ester ranges from about 0.1 to about 0.3.

5. The composition of claim 4, wherein the volume ratio of the at least one amphoacetate, the at least one amphodiacetate, or any combination thereof with respect to the combined volume of the one or more zwitterionic surfactants and the reaction product of the saccharide polymer and the fatty acid or the fatty ester ranges from about 0.2 to about 0.3.

6. The composition of claim 4, wherein the one or more zwitterionic surfactants further comprise at least one betaine, at least one sultaine, or any combination thereof.

7. A composition comprising:
   an aqueous fluid;
   a neutral surfactant or a reaction product form thereof;
   a reaction product of a saccharide polymer and a fatty acid or a fatty ester, the saccharide polymer comprising a dextran, a dextrin compound, or any combination thereof, and the reaction product of the saccharide polymer and the fatty acid or the fatty ester and the reaction product form of the neutral surfactant, if present, being formed in the presence of an aqueous hydroxide base; and
   one or more zwitterionic surfactants;
   wherein a volume ratio of the one or more zwitterionic surfactants with respect to a combined volume of the one or more zwitterionic surfactants and the reaction product of the saccharide polymer and the fatty acid or the fatty ester is sufficient to make the composition brine-tolerant;
   wherein the one or more zwitterionic surfactants comprise at least one amphoacetate, at least one amphodiacetate, or any combination thereof, and a volume ratio of the at least one amphoacetate, the at least one amphodiacetate, or any combination thereof with respect to the combined volume of the one or more zwitterionic surfactants and the reaction product of the saccharide polymer and the fatty acid or the fatty ester ranges from about 0.1 to about 0.3.

8. The composition of claim 1, wherein the neutral surfactant or the reaction product form thereof is present in a sufficient concentration to solubilize the reaction product of the saccharide polymer and the fatty acid or the fatty ester in the aqueous fluid.

9. The composition of claim 1, wherein the reaction product of the saccharide polymer comprises a fatty ester saccharide polymer reaction product.

10. The composition of claim 1, wherein the neutral surfactant comprises a fatty acid alkanolamide.

11. The composition of claim 1, wherein the aqueous fluid comprises a brine.

12. A subterranean treatment fluid comprising the composition of claim 7.

13. The subterranean treatment fluid of claim 12, wherein the one or more zwitterionic surfactants further comprise at least one betaine, at least one sultaine, or any combination thereof.

14. A method comprising:
providing the composition of claim 7; and
contacting the composition with a brine-containing substance.

15. The method of claim 14, wherein the brine-containing substance also comprises an oleaginous material.

16. The method of claim 15, wherein the oleaginous material comprises petroleum, natural gas, an oilfield fluid, or any combination thereof.

17. The method of claim 14, wherein the one or more zwitterionic surfactants further comprise at least one betaine, at least one sultaine, or any combination thereof.

18. The method of claim 14, wherein the neutral surfactant comprises a fatty acid alkanolamide.

19. The composition of claim 7, wherein the composition is non-emulsifying toward oleaginous fluids.

20. The composition of claim 19, wherein the one or more zwitterionic surfactants further comprise at least one betaine, at least one sultaine, or any combination thereof.

21. A composition comprising:
an aqueous fluid;
a neutral surfactant or a reaction product form thereof;
a reaction product of a saccharide polymer and a fatty acid or a fatty ester, the saccharide polymer comprising a dextran, a dextrin compound, or any combination thereof, and the reaction product of the saccharide polymer and the fatty acid or the fatty ester and the reaction product form of the neutral surfactant, if present, being formed in the presence of an aqueous hydroxide base; and
one or more zwitterionic surfactants;
wherein a volume ratio of the one or more zwitterionic surfactants with respect to a combined volume of the one or more zwitterionic surfactants and the reaction product of the saccharide polymer and the fatty acid or the fatty ester is sufficient to make the composition brine-tolerant;
wherein the composition is non-emulsifying toward oleaginous fluids, and the one or more zwitterionic surfactants comprise at least one amphoacetate, at least one amphodiacetate, or any combination thereof.

* * * * *